US012696188B2

(12) United States Patent
Muhammad et al.

(10) Patent No.: US 12,696,188 B2
(45) Date of Patent: Jul. 28, 2026

(54) IMPLEMENTING AN ADVANCED SLEEP MODE IN A TELECOMMUNICATIONS NETWORK

(71) Applicant: RAKUTEN MOBILE, INC., Tokyo (JP)

(72) Inventors: Awn Muhammad, Tokyo (JP); Pankaj Tanaji Shete, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 323 days.

(21) Appl. No.: 18/689,313

(22) PCT Filed: Dec. 7, 2023

(86) PCT No.: PCT/US2023/082832
§ 371 (c)(1),
(2) Date: Mar. 5, 2024

(87) PCT Pub. No.: WO2024/158481
PCT Pub. Date: Aug. 2, 2024

(65) Prior Publication Data
US 2025/0203505 A1 Jun. 19, 2025

Related U.S. Application Data

(60) Provisional application No. 63/481,637, filed on Jan. 26, 2023.

(51) Int. Cl.
*H04W 52/02* (2009.01)
*H04W 24/02* (2009.01)

(52) U.S. Cl.
CPC ....... *H04W 52/0203* (2013.01); *H04W 24/02* (2013.01)

(58) Field of Classification Search
CPC .......................... H04W 24/02; H04W 52/0203
(Continued)

(56) References Cited

U.S. PATENT DOCUMENTS

2010/0323647 A1* 12/2010 Ryu .................. H04W 52/0251
455/127.5
2021/0045072 A1* 2/2021 Parzysz ............. H04W 52/0206
2022/0167236 A1 5/2022 Melodia et al.

OTHER PUBLICATIONS

Niknam, et al., "Intelligent O-RAN for Beyond 5G and 6G Wireless Networks", IEEE Globecom Workshops (GC Wkshps): Workshop on Next-Generation Radio Access Networks: Architectures, Interfaces, and Implementations, 2022, pp. 215-220 (6 pages).
(Continued)

*Primary Examiner* — Peter G Solinsky
(74) *Attorney, Agent, or Firm* — Sughrue Mion, PLLC

(57) ABSTRACT

System and method for implementing advanced sleep modes in an O-RAN, the method includes collecting measurement data for training an AI/ML model; based on the collected measurement data, training an A/ML model and deploying the AI/ML model in the nRT-RIC; activating the trained AI/ML model in the nRT-RIC; monitoring energy optimization data for AI/ML model inference from an open radio unit (O-RU) via an E2 node; activating at least one advanced sleep mode (ASM) in the nRT-RIC; based on the activation of the ASM, collecting data to temporarily deactivate O-RU components; based on the activated AI/ML model and the ASM, evaluating, the collected data to temporarily deactivate O-RU components; based on the evaluating, requesting to initiate the ASM to the O-RU; based on the ASM initiation request, implementing the ASM, by the E2 node and the O-RU.

20 Claims, 16 Drawing Sheets

(58) Field of Classification Search
USPC ......................................................... 370/311
See application file for complete search history.

(56) References Cited

OTHER PUBLICATIONS

Erfanian, et al., "Green Future Networks Network Energy Efficiency", NGMN Alliance, Dec. 15, 2021, pp. 1-55 (56 pages).
Lin, et al., "Zero-Touch Network on Industrial lo T: An End-to-End Machine Learning Approach", IEEE Network, Apr. 26, 2022, arXiv:2204.12605v1 [cs/LG], pp. 1-8 (8 pages).
O-RAN Working Group 1 Use Cases Detailed Specification, O-RAN. WG1.Use-Cases-Detailed- Specification-v09.00, O-Ran Alliance, Technical Specification, 2022, pp. 1-4 and 105-111 (11 pages).
O-RAN Working Group 1 Use Cases Analysis Report, O-RAN. WG1.Use-Cases-Analysis-Report-v09.00, O-Ran Alliance, Technical Report, 2022, pp. 1-4 and 55-63 (13 pages).

* cited by examiner

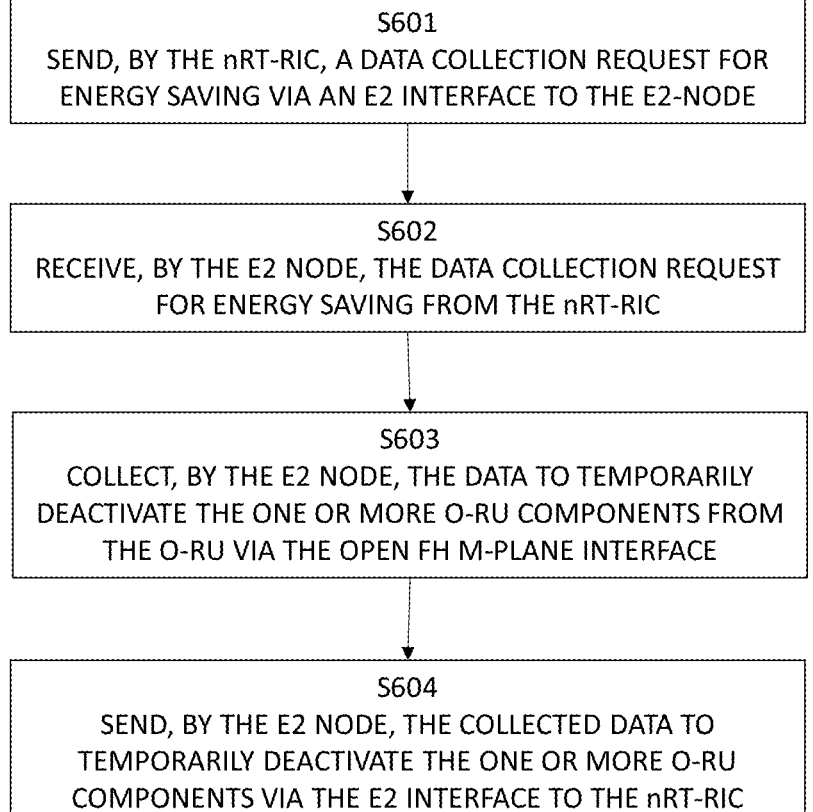

S601
SEND, BY THE nRT-RIC, A DATA COLLECTION REQUEST FOR
ENERGY SAVING VIA AN E2 INTERFACE TO THE E2-NODE

S602
RECEIVE, BY THE E2 NODE, THE DATA COLLECTION REQUEST
FOR ENERGY SAVING FROM THE nRT-RIC

S603
COLLECT, BY THE E2 NODE, THE DATA TO TEMPORARILY
DEACTIVATE THE ONE OR MORE O-RU COMPONENTS FROM
THE O-RU VIA THE OPEN FH M-PLANE INTERFACE

S604
SEND, BY THE E2 NODE, THE COLLECTED DATA TO
TEMPORARILY DEACTIVATE THE ONE OR MORE O-RU
COMPONENTS VIA THE E2 INTERFACE TO THE nRT-RIC

FIG. 6

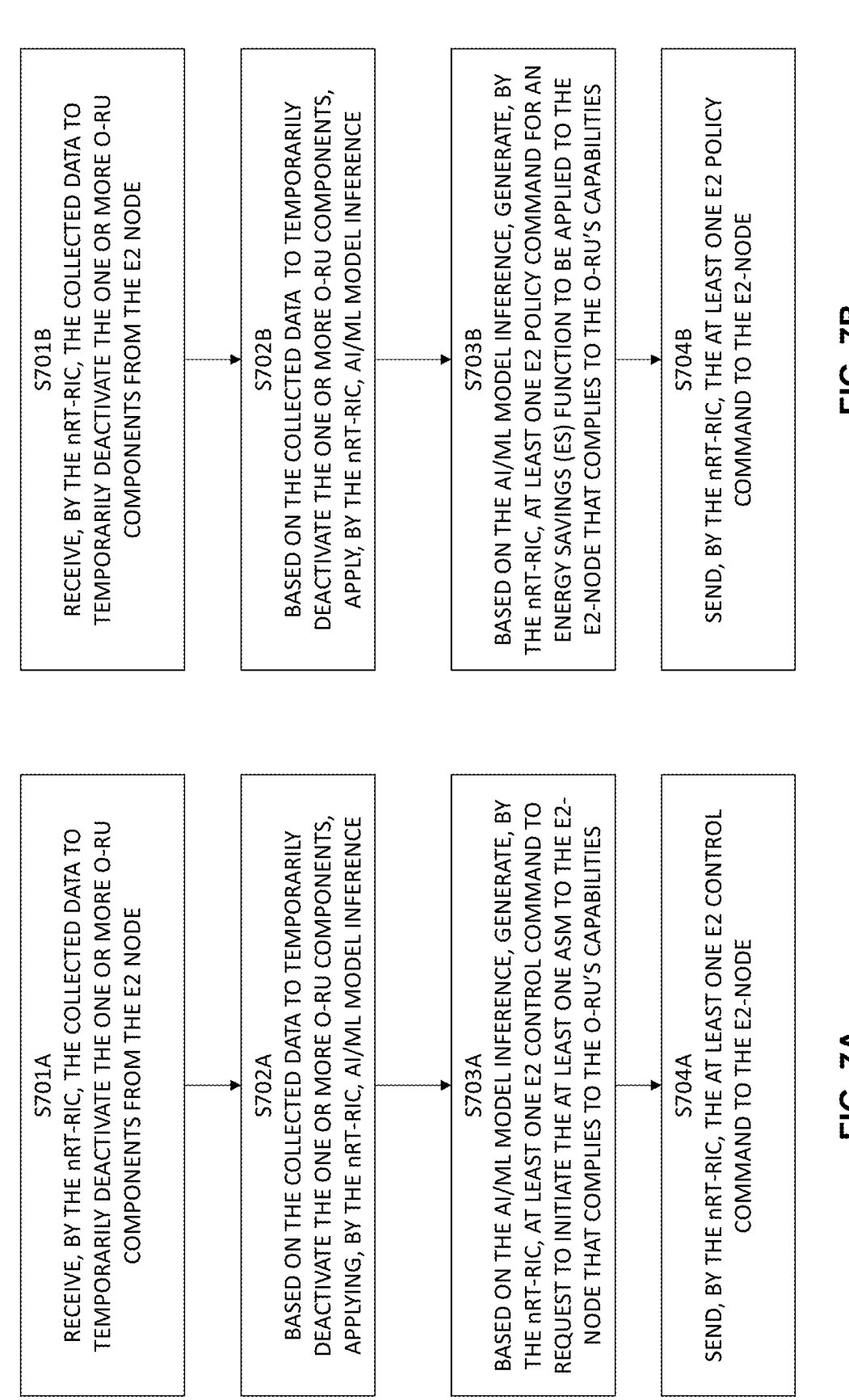

FIG. 7B

S701B
RECEIVE, BY THE nRT-RIC, THE COLLECTED DATA TO TEMPORARILY DEACTIVATE THE ONE OR MORE O-RU COMPONENTS FROM THE E2 NODE

S702B
BASED ON THE COLLECTED DATA TO TEMPORARILY DEACTIVATE THE ONE OR MORE O-RU COMPONENTS, APPLY, BY THE nRT-RIC, AI/ML MODEL INFERENCE

S703B
BASED ON THE AI/ML MODEL INFERENCE, GENERATE, BY THE nRT-RIC, AT LEAST ONE E2 POLICY COMMAND FOR AN ENERGY SAVINGS (ES) FUNCTION TO BE APPLIED TO THE E2-NODE THAT COMPLIES TO THE O-RU'S CAPABILITIES

S704B
SEND, BY THE nRT-RIC, THE AT LEAST ONE E2 POLICY COMMAND TO THE E2-NODE

FIG. 7A

S701A
RECEIVE, BY THE nRT-RIC, THE COLLECTED DATA TO TEMPORARILY DEACTIVATE THE ONE OR MORE O-RU COMPONENTS FROM THE E2 NODE

S702A
BASED ON THE COLLECTED DATA TO TEMPORARILY DEACTIVATE THE ONE OR MORE O-RU COMPONENTS, APPLYING, BY THE nRT-RIC, AI/ML MODEL INFERENCE

S703A
BASED ON THE AI/ML MODEL INFERENCE, GENERATE, BY THE nRT-RIC, AT LEAST ONE E2 CONTROL COMMAND TO REQUEST TO INITIATE THE AT LEAST ONE ASM TO THE E2-NODE THAT COMPLIES TO THE O-RU'S CAPABILITIES

S704A
SEND, BY THE nRT-RIC, THE AT LEAST ONE E2 CONTROL COMMAND TO THE E2-NODE

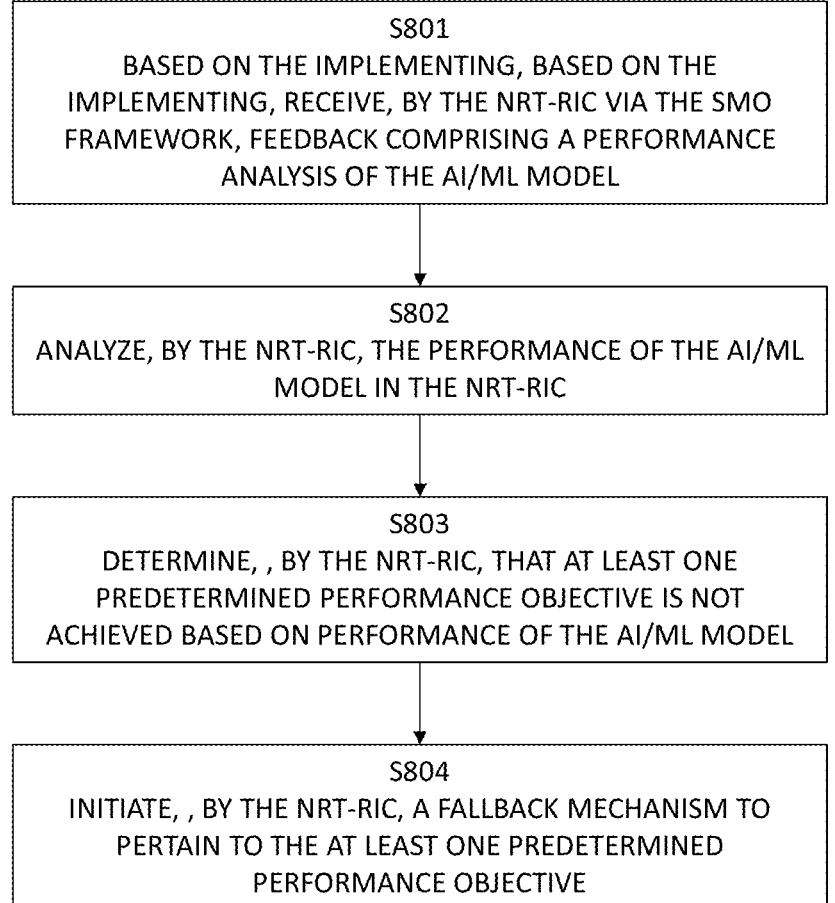

S801
BASED ON THE IMPLEMENTING, BASED ON THE
IMPLEMENTING, RECEIVE, BY THE NRT-RIC VIA THE SMO
FRAMEWORK, FEEDBACK COMPRISING A PERFORMANCE
ANALYSIS OF THE AI/ML MODEL

S802
ANALYZE, BY THE NRT-RIC, THE PERFORMANCE OF THE AI/ML
MODEL IN THE NRT-RIC

S803
DETERMINE, , BY THE NRT-RIC, THAT AT LEAST ONE
PREDETERMINED PERFORMANCE OBJECTIVE IS NOT
ACHIEVED BASED ON PERFORMANCE OF THE AI/ML MODEL

S804
INITIATE, , BY THE NRT-RIC, A FALLBACK MECHANISM TO
PERTAIN TO THE AT LEAST ONE PREDETERMINED
PERFORMANCE OBJECTIVE

FIG. 8

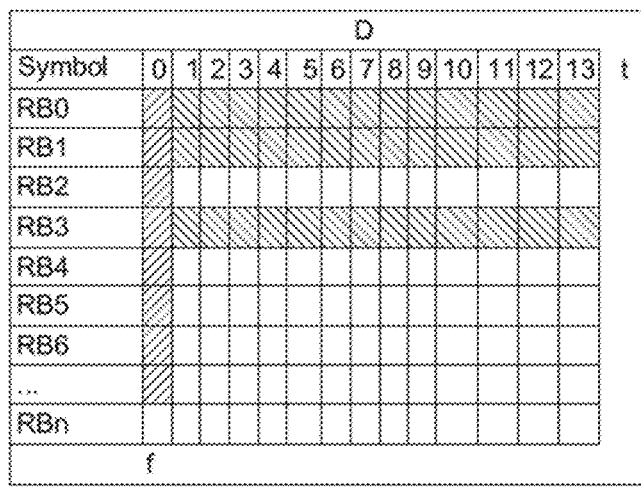
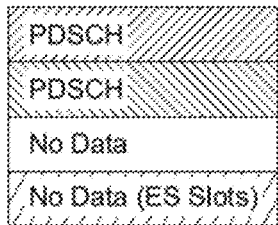
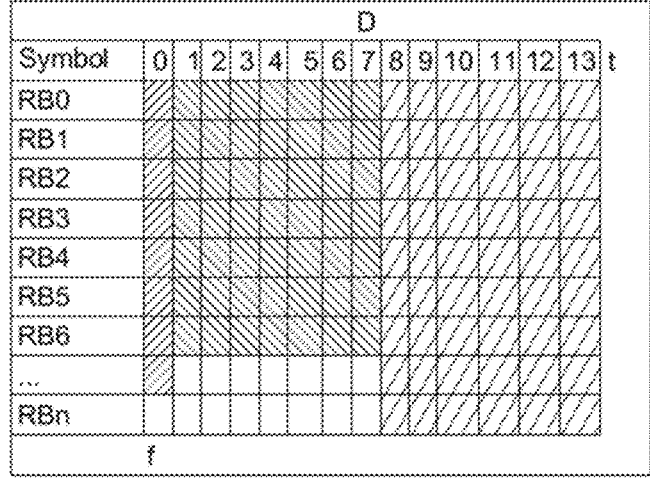
FIG. 10

Data Convergence in Slots

Slots

| Symbol | 0 | 1 | 2 | 3 | 4 | 5 | 6 | 7 | 8 | 9 | 10 | t |
|--------|---|---|---|---|---|---|---|---|---|---|----|---|
| RBG0 | | | | | | | | | | | | |
| RBG1 | | | | | | | | | | | | |
| RBG2 | | | | | | | | | | | | |
| RBG3 | | | | | | | | | | | | |
| RBG4 | | | | | | | | | | | | |
| RBG5 | | | | | | | | | | | | |
| RBG6 | | | | | | | | | | | | |
| ... | | | | | | | | | | | | |
| RBGn | | | | | | | | | | | | | f

| SSB-MIB |
| SIB1 |
| Other SI |
| Paging |
| PDSCH |
| No Transmission - Energy saved by Data convergence |
| No Data |

Slots

| Symbol | 0 | 1 | 2 | 3 | 4 | 5 | 6 | 7 | 8 | 9 | 10 | t |
|--------|---|---|---|---|---|---|---|---|---|---|----|---|
| RBG0 | | | | | | | | | | | | |
| RBG1 | | | | | | | | | | | | |
| RBG2 | | | | | | | | | | | | |
| RBG3 | | | | | | | | | | | | |
| RBG4 | | | | | | | | | | | | |
| RBG5 | | | | | | | | | | | | |
| RBG6 | | | | | | | | | | | | |
| ... | | | | | | | | | | | | |
| RBGn | | | | | | | | | | | | | f

FIG. 11

IMPLEMENTING AN ADVANCED SLEEP MODE IN A TELECOMMUNICATIONS NETWORK

CROSS-REFERENCE TO RELATED APPLICATION(S)

This application is a National Stage of International Application No. PCT/US2023/082832 filed Dec. 7, 2023, claiming priority based on U.S. Provisional Patent Application No. 63/481,637 filed on Jan. 26, 2023, the disclosure of which is incorporated by reference herein in its entirety.

TECHNICAL FIELD

The present disclosure relates to implementing an advanced sleep mode to reduce power consumption of a radio base station (BS) in a telecommunications network.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into an open centralized unit (O-CU), an open distributed unit (O-DU), and an open radio unit (O-RU). The O-CU is a logical node for hosting Radio Resource Control (RRC), Service Data Adaptation Protocol (SDAP), and/or Packet Data Convergence Protocol (PDCP) sublayers of the RAN. The O-DU is a logical node hosting Radio Link Control (RLC), Media Access Control (MAC), and Physical (PHY) sublayers of the O-RAN. The O-RU is a physical node that converts radio signals from antennas to digital signals that can be transmitted over the FrontHaul (FH) to an O-DU. Because these entities have open protocols and interfaces between them, they can be developed by different vendors.

In the related art, the power consumption of a Base Station BS (e.g., an open radio unit O-RU) varies with the amount of cell traffic. As traffic increases, the physical components of the O-RU(s), for example, the RF front-end module (RFFE) (e.g., the Power Amplifier(s) (PA(s)), the Radio Frequency (RF) transceiver(s) TRx(s), etc. become the main energy consumer. However, in low traffic scenarios, the main energy consumption is from functional components (i.e., the processing equipment) such as the Digital RF front end (DFE), lower PHY layer baseband processing function(s), Synchronization and Fronthaul transport function(s) become the main energy consumer. Furthermore, in the related art, O-DU(s) and/or O-CU(s) (i.e., the E2 node(s)) may have to support several techniques (i.e., depending on specific scenarios and network deployments) that may affect energy consumption and may also be load dependent (e.g., network traffic, user number, etc.).

To this end, as the E2 node(s) (e.g., O-DU, O-CU, etc.) may be not aware of the inner architecture of multiple-vendor O-RU designs (i.e., the capability of the functional and physical components of the O-RU(s)), the related art has the disadvantage that even when no transmission is taking place, some parts (e.g., the functional parts and/or physical parts) of the O-RU continue to consume energy.

As a result, according to the related art, high-level (i.e., blanket) energy-saving modes according to a performance target as provided, for example, via A1 policies, performance triggers based on O-RAN key performance indicators (KPIs) (e.g., data traffic, data throughput), etc. are limited to energy-saving models applied by the O-DU without knowledge of the O-RU capabilities to save energy (e.g., the inner system architecture of the O-RU such as the capabilities of the physical components and/or functional components of the O-RU). Thus, the energy-saving models (i.e., blanket energy-saving modes) applied to the O-RU in accordance with the related art may cause unnecessary energy consumption due to an inferior application of these energy-saving modes caused by a lack of knowledge of the component capabilities of the O-RU.

Moreover, in view of the local or network-wide impact of energy-saving modes in the O-RAN, there is a trade-off between system performance and energy conservation. Thus, according to the related art, implementing energy-saving modes while maintaining a high overall network performance of the O-RAN is a non-trivial and complex task. For example, other carriers and/or cells may have to cover (i.e., to take over or serve) additional network traffic, wherein network traffic is changing over time.

To this end, the related art lacks abstraction levels that allow an effective balancing of system performance and energy savings.

As a result, while conserving energy for one O-RU, according to energy-saving modes in the related art, may be maximized on a local basis, the overall network performance of the O-RAN may decrease due to the complex task that involves balancing system performance and energy savings.

SUMMARY

According to embodiments, the present disclosure relates to implementing advanced sleep modes (ASM) that enable a near-real-time radio access network intelligence controller (nRT-RIC) to consider multiple data dimensions, such as, for example, traffic load, user service type, and energy efficiency measurements, O-DU capabilities, O-RU capabilities, etc. to determine which ASM (i.e., which level or type of ASM) may best be applied by an energy savings (ES) function to achieve an optimal balance between system performance and energy savings. To the end, each level of ASM (i.e., type of ASM) comprises one or more intelligent scheduling features associated with the respective ASM level/type, and each of the one or more intelligent scheduling features applied by the O-DU and/or O-CU to O-RU cause different power consumption levels of the O-RU component(s) (i.e., physical components and/or functional components of the O-RU).

In particular, one or more intelligent scheduling features may include scheduling of slots and/or symbols (e.g., by data convergence (traffic shaping), wherein the (intelligent scheduling features (e.g., the scheduling) associated with one or more ASM types/levels has the advantage to allow a temporary deactivation (mute/switch off) of O-RU components that optimizes the power consumption of O-RU.

As a result, the implementation of one or more ASM types/levels considering the capability data of the O-RU and/or the O-DU enables abstraction levels of energy-saving modes that allow an optimal operational energy efficiency of the O-RU(s), while maintaining a high level of network performance with the entire O-RAN.

According to embodiments, a system for implementing advanced sleep modes in an open radio access network (O-RAN), the system includes: a near-real-time radio access network (RAN) intelligent controller (nRT-RIC) and a service management and orchestration (SMO) framework, the SMO framework comprising a non-real-time radio access network (RAN) intelligent controller (NRT-RIC), wherein the system is configured to: collect, by the SMO framework, measurement data for training an artificial intelligence/machine learning (AI/ML) model; based on the collected measurement data, by the NRT-RIC, train an AI/ML model and deploy the AI/ML model in the nRT-RIC; activate, by the SMO framework, the trained AI/ML model in the nRT-RIC; monitor, by the NRT-RIC, energy optimization data for AI/ML model inference from an open radio unit (O-RU) via an E2 node; activate, by the SMO framework, at least one advanced sleep mode (ASM) in the nRT-RIC; based on the activation of the at least one ASM, by the nRT-RIC, collect data to temporarily deactivate one or more O-RU components from the O-RU via the E2 node; based on the activated AI/Mb model and the at least one ASM, evaluate, by nRT-RIC, the collected data to temporarily deactivate one or more O-RU components; based on the evaluating, request, by the nRT-RIC, to initiate the at least one ASM to the O-RU via the E2 node; and based on the ASM initiation request, by the O-RU, implement the at least one ASM.

According to embodiments, method for implementing advanced sleep modes in an open radio access network (O-RAN), the method includes: collecting, by an service management and orchestration (SMO) framework, measurement data for training an artificial intelligence/machine learning (AI/ML) model; based on the collected measurement data, by a non-real-time radio access network (RAN) intelligent controller (NRT-RIC), training an AI/ML model and deploying the AI/ML model in an a near-real-time radio access network (RAN) intelligent controller (nRT-RIC); activating, by the SMO framework, the trained AI/ML model in the nRT-RIC; monitoring, by the NRT-RIC, energy optimization data for AI/ML model inference from an open radio unit (O-RU) via an E2 node; activating, by the SMO framework, at least one advanced sleep mode (ASM) in the nRT-RIC; based on the activation of the at least one ASM, by the nRT-RIC, collecting data to temporarily deactivate one or more O-RU components from the O-RU via the E2 node; based on the activated AI/Mb model and the at least one ASM, evaluating, by nRT-RIC, the collected data to temporarily deactivate one or more O-RU components; based on the evaluating, requesting, by the nRT-RIC, to initiate the at least one ASM to the O-RU via the E2 node; and based on the ASM initiation request, by the O-RU, implementing the at least one ASM.

According to embodiments, a non-transitory computer-readable recording medium having recorded thereon instructions executable by at least one processor, at least one processor configured to implement a method for implementing advanced sleep modes in an open radio access network (O-RAN), the method includes: collecting, by an service management and orchestration (SMO) framework, measurement data for training an artificial intelligence/machine learning (AI/ML) model; based on the collected measurement data, by a non-real-time radio access network (RAN) intelligent controller (NRT-RIC), training an AI/ML model and deploying the AI/ML model in a near-real-time radio access network (RAN) intelligent controller (nRT-RIC); activating, by the SMO framework, the trained AI/ML model in the nRT-RIC; monitoring, by the NRT-RIC, energy optimization data for AI/Mb model inference from an open radio unit (O-RU) via an E2 node; activating, by the SMO framework, at least one advanced sleep mode (ASM) in the nRT-RIC; based on the activation of the at least one ASM, by the nRT-RIC, collecting data to temporarily deactivate one or more O-RU components from the O-RU via the E2 node; based on the activated AI/ML model and the at least one ASM, evaluating, by nRT-RIC, the collected data to temporarily deactivate one or more O-RU components; based on the evaluating, requesting, by the nRT-RIC, to initiate the at least one ASM to the O-RU via the E2 node; and based on the ASM initiation request, by the O-RU, implementing the at least one ASM.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 6 illustrates a flow diagram of a method for collecting data to temporarily deactivate one or more O-RU components based on the activation of at least one ASM, according to another embodiment;

FIG. 7A illustrates a flow diagram of a method for evaluating the collected data to temporarily deactivate one or more O-RU components according to an embodiment;

FIG. 7B illustrates a flow diagram of a method for evaluating the collected data to temporarily deactivate one or more O-RU components according to an embodiment;

FIG. 8 illustrates a flow diagram of a method for implementing advanced sleep modes according to an embodiment;

FIG. 10 illustrates a method for scheduling at least one symbol to minimize the number of symbols in the time domain according to an embodiment;

FIG. 11 illustrates a method for scheduling at least one slot to minimize the number of slots in the time domain according to an embodiment;

DETAILED DESCRIPTION

Figure 1:
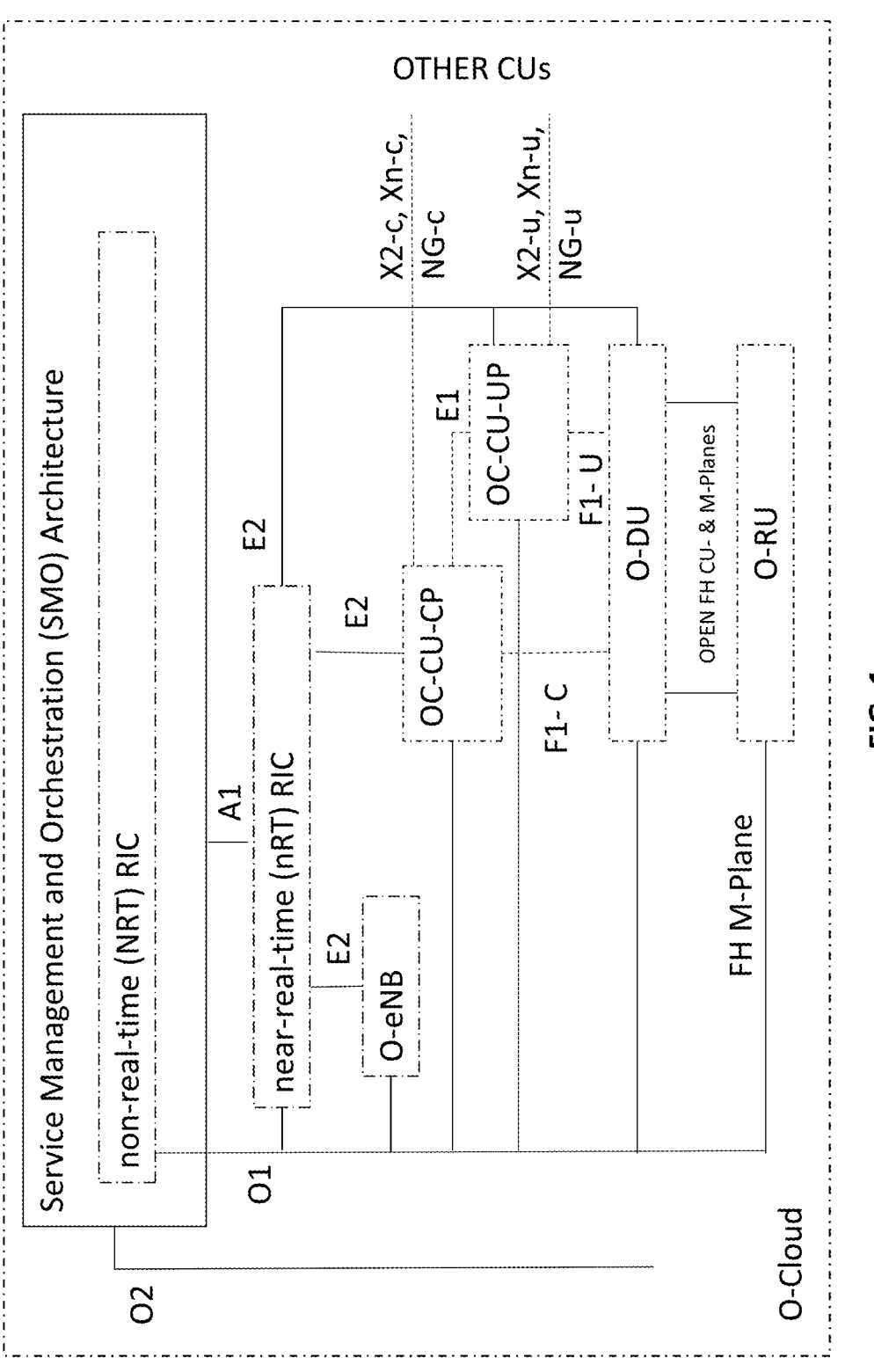
FIG. 1 illustrates an O-RAN architecture in the related art.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by an RIC. The RIC is a software-defined component that implements modular applications to facilitate the multivendor operability required in the O-RAN system. The RIC also automates and optimizes RAN operations. The RIC is divided into two types: a non-real-time RIC (NRT-RIC) and a near-real-time RIC (nRT-RIC).

The NRT-RIC is the control point of a non-real-time control loop and operates on a timescale greater than 1 second within the Service Management and Orchestration (SMO) framework. Its functionalities are implemented through modular applications called rApps (rApp 1, . . . , rApp N), and include: providing policy-based guidance and enrichment across the A1 interface, which is the interface that enables communication between the NRT-RIC and the nRT-RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., nRT-RIC, O-RAN Centralized Unit (O-CU), O-RAN Distributed Unit (O-DU), etc.).

The nRT-RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT-RIC uses the E2 interface to control the underlying RAN elements (E2 node(s)/network functions (NFs)) over a near-real-time control loop. The nRT-RIC monitors, suspends/stops, overrides, and controls the E2 node(s) (O-CU, O-DU, and O-eNB) via policies. For example, the nRT-RIC sets policy parameters on activated functions of the E2 node(s). Further, the nRT-RIC hosts xApps to implement functions such as quality of service (QoS) optimization, mobility optimization, slicing optimization, interference mitigation, load balancing, security, etc. The two types of RICs work together to optimize the O-RAN. For example, the NRT-RIC provides, over the A1 interface, the policies, data, and artificial intelligence/machine learning AI/ML models enforced and used by the nRT-RIC for RAN optimization, and the nRT-RIC returns policy feedback (i.e., how the policy set by the NRT-RIC works).

The SMO framework, within which the NRT-RIC is located, manages and orchestrates RAN elements. Specifically, the SMO manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS).

The O-Cloud, on the other hand, is a cloud computing platform comprising a collection of physical infrastructure nodes that meet O-RAN requirements to host the relevant O-RAN functions (e.g., nRT-RIC, O-CU-CP, O-CU-UP, O-DU, etc.), the supporting software components (such as Operating System, Virtual Machine Monitor, Container Runtime, etc.) and the appropriate management and orchestration functions.

The SMO framework, within which the NRT-RIC is located, manages and orchestrates RAN elements. The SMO performs management and orchestration of RAN elements through four key interfaces: the A1 Interface between the NRT-RIC in the SMO and the nRT-RIC for RAN Optimization; the O1 Interface between the SMO and the O-RAN Network Functions for FCAPS support; in the case of a hybrid model, an Open FrontHaul (FH) M-plane interface between SMO and O-RU for FCAPS support; the O2 Interface between the SMO and the O-Cloud to platform resources and workload management.

Figure 2:
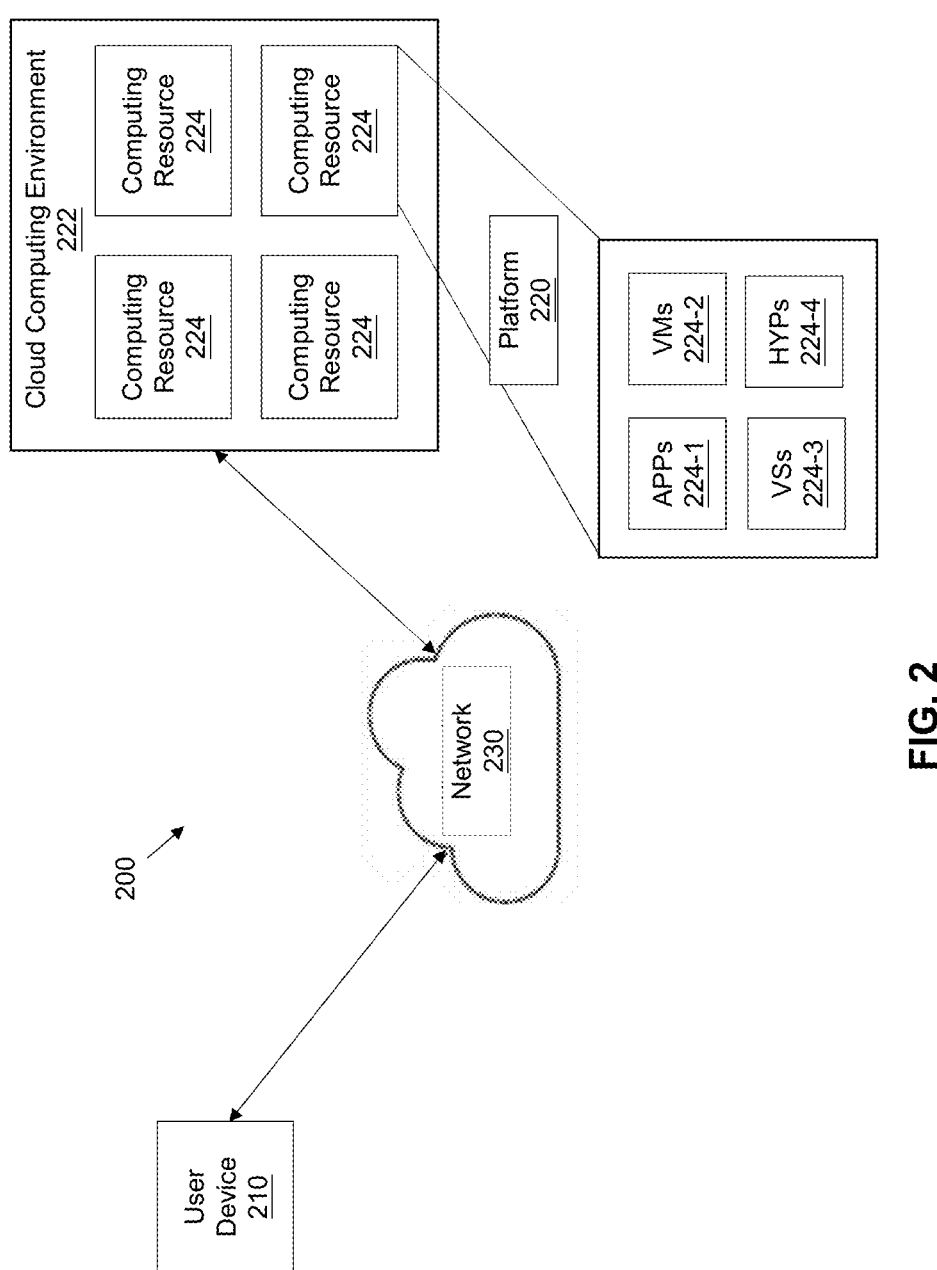
FIG. 2 illustrates a diagram of an example environment in which systems and/or methods, described herein, may be implemented.

FIG. 2 illustrates a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections. In embodiments, any of the functions and operations described with reference to FIG. 1 above may be performed by any combination of elements illustrated in FIG. 2.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smartphone, a radiotelephone, etc.), a wearable device (e.g., a pair of smart glasses or a smartwatch), or a similar device. In some implementations, user device 210 may receive information from and/or transmit information to platform 220.

Platform 220 includes one or more devices capable of receiving, generating, storing, processing, and/or providing information. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 may not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc., services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, a cluster of computing devices, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate the need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports the execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
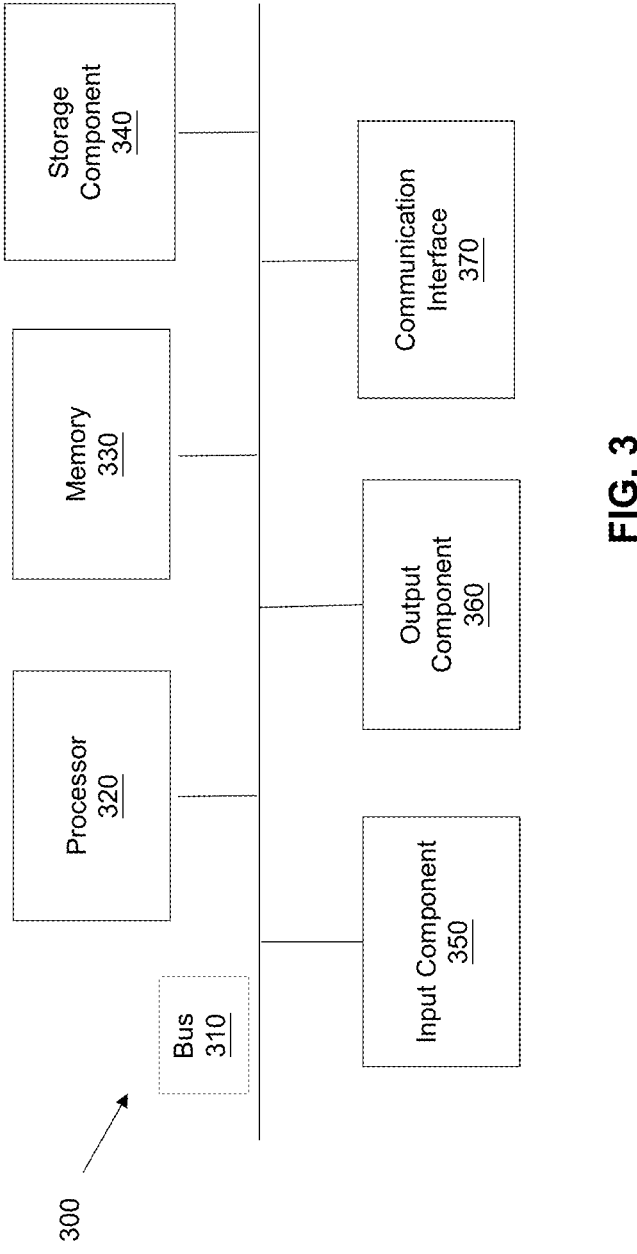
FIG. 3 illustrates a diagram of example components of a device according to an embodiment.

FIG. 3 illustrates a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read-only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the operations or processes of FIGS. 4, 5, 6, 7 and 8 may be implemented by or using any one of the elements illustrated in FIGS. 1, 2 and 3. It is understood that other embodiments are not limited thereto, and may be implemented in a variety of different architectures (e.g., bare metal architecture, any cloud-based architecture or deployment architecture such as Kubernetes, Docker, OpenStack, etc.).

Figure 4:
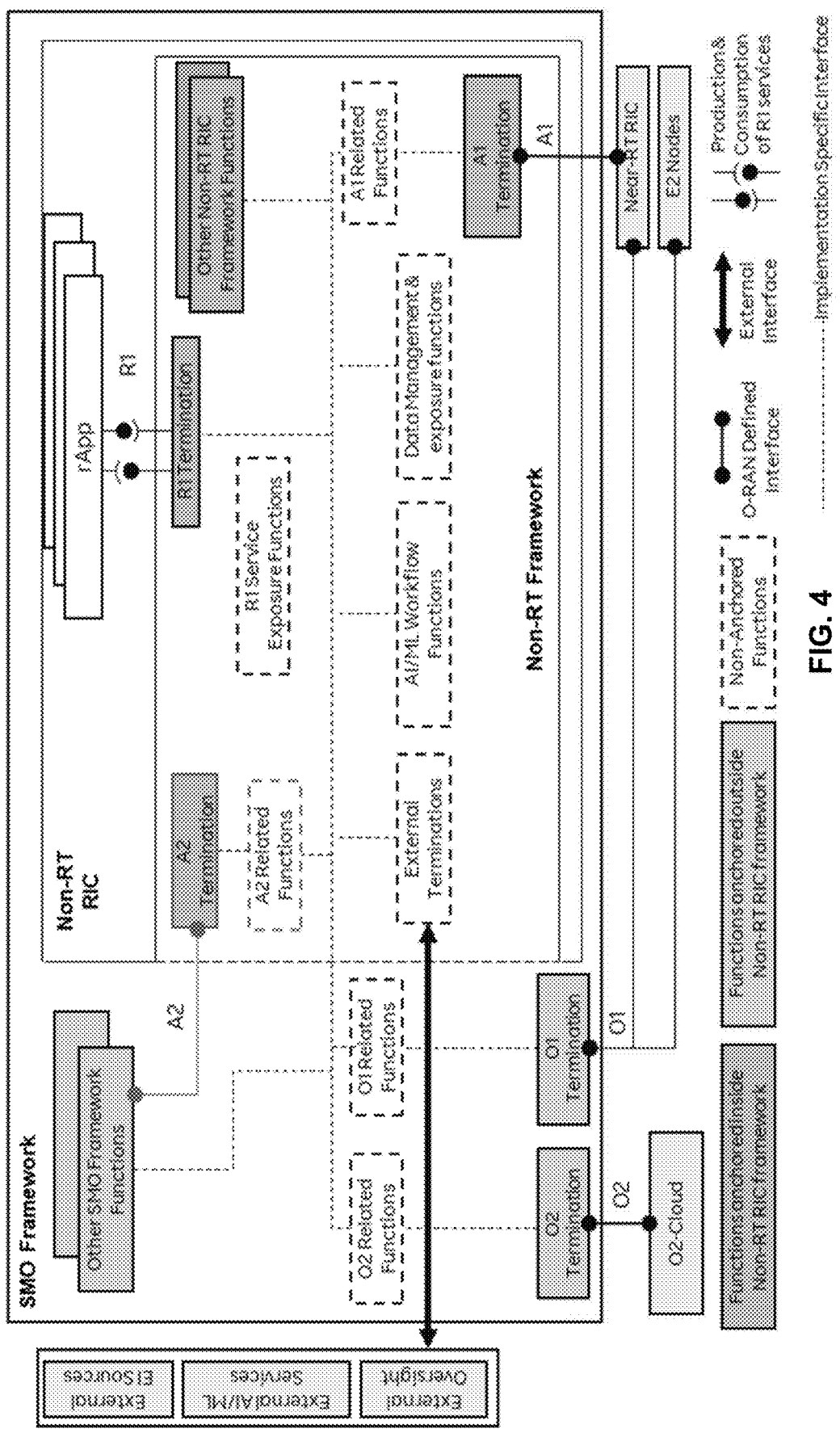
FIG. 4 illustrates the SMO/NRT-RIC framework system architecture configured to implement the optimization of a partial shutdown of O-RU components based on an A1 policy according to an embodiment.

FIG. 4 illustrates the SMO/NRT-RIC framework system architecture configured to implement advanced sleep modes according to an embodiment.

Referring to FIG. 4, the NRT-RIC framework and the NRT-RIC within the NRT-RIC framework represent a subset of functionalities of the SMO framework. The NRT-RIC can access other SMO framework functionalities and thereby influence (i.e., controls and/or executes) what is carried across the O1 and O2 interface (e.g., performing configuration management (CM) and/or performance management (PM)).

The SMO framework system architecture includes SMO functions that include an O1 termination that enables communication between the SMO framework and E2 node(s) (i.e., O-CU, O-DU, etc.) via the O1 interface.

The SMO framework system architecture includes SMO functions that include an O2 termination that enables communication between the SMO framework and E2 node(s) (i.e., O-CU, O-DU, etc.) via the O2 interface.

The NRT-RIC includes an NRT-RIC framework. The NRT-RIC framework, among a plurality of other functions, includes R1 service exposure functions that handle R1 services provided in accordance with example embodiments. In general, the NRT-RIC functions within the NRT-RIC framework support the authorization, authentication, registration, discovery, communication support, etc., for rAPPs.

In general, R1 services may include a collection of services including, but not limited to, service registration and discovery services, authentication and authorization services, AI/ML workflow services, and A1, O1 and O2-interface related services.

NRT-RIC Applications (rApps) are applications that leverage the functionalities available in the NRT-RIC framework and/or SMO Framework to provide value-added services related to RAN operation and optimization. The scope of rApps includes, but is not limited to, radio resource management, data analytics, etc., and enrichment of information. In general, a rApp refers to an application designed to consume and/or produce R1 services.

To this end, the NRT-RIC framework produces and/or consumes R1 services according to example embodiments via an R1 interface. The R1 interface terminates in an R1 termination of the NRT-RIC framework. The R1 termination connects to the NRT-RIC framework and the rApps via the R1 interface and enables the NRT-RIC framework and rApps to exchange messages/data (i.e., requests and responses comprising of data models) to access the R1 services via the R1 interface.

In general, the R1 interface is defined as an interface between rApps and the NRT-RIC framework via which R1 services can be produced and consumed.

Moreover, the NRT-RIC framework comprises A1-related functions. The A1-related functions of the NRT-RIC framework support, for example, A1 logical termination, A1-policy coordination and catalog, A1-EI coordination and catalog, etc.

In particular, the NRT-RIC framework and the A1-related functions therein provide the A1 policy (i.e., a set of rules that are used to manage and control the changing and/or maintaining of the state of one or more managed objects) based on guidance and enrichment across the A1 interface, which is the interface that enables the communication between the NRT-RIC and the nRT-RIC (i.e., an A1 policy that is, according to the related art, a type of declarative policies expressed using formal statements that enable the NRT-RIC within the SMO to guide the nRT-RIC, and hence the RAN, towards better fulfillment of the RAN intent (e.g., predetermined performance objectives)).

The data management and exposure services within the NRT-RIC framework deliver data created or collected by data producers to data consumers according to their needs (e.g., function management (FM)/consumption management (CM)/production management (PM) data to rApps or CM changes from rApps to the O-RAN via the O1 interface.

The NRT-RIC framework further comprises External Terminations. The External Terminations, for example, support an exchange of data between the NRT-RIC framework and external AI/ML functions, Enrichment Information (EI) Sources, or an External Oversight.

Within the NRT-RIC framework, the AI/ML workflow services provide access to AI/ML workflow. For example, the AI/Mb workflow services may assist in training models, monitoring, etc. the deployed AI/Mb models in NRT-RIC.

As a result, the NRT-RIC framework and AI/ML workflow services therein enable artificial intelligence and machine learning (AI/ML) training and inference for RAN optimization.

Moreover, the NRT-RIC framework comprises A2-related functions that support, for example, A2 logical termination, A2-Policy coordination and catalog, etc.

Referring to FIG. 4, the NRT-RIC framework (e.g., the at least one rApp hosted by the NRT-RIC and/or the NRT-RIC framework) allows for flexible parameters for temporarily deactivating O-RU components (e.g., physical and functional components in the O-RU) in a cell or in a cluster of cells by providing A1 policies over an A1 interface that are formulated by NRT-RIC (e.g., by the at least one rApp hosted by the NRT-RIC and/or the NRT-RIC framework assisted by machine learning (ML) techniques) towards nRT-RIC, wherein the nRT-RIC via E2 interface actions may enforce the deployment of the configured parameters for temporarily deactivate O-RU components (e.g., physical and functional components in the O-RU) towards one more E2 nodes.

Referring to FIG. 4, the SMO and NRT-RIC framework are configured (e.g., the SMO and NRT-RIC framework may include collect and control functions) to collect data to temporarily deactivate one or more O-RU components. For example, necessary cell configurations, performance indicators, measurement reports (e.g., cell load-related information and traffic information, energy efficiency EE and/or energy consumption EC measurement reports, geolocation information, etc.), etc. from the E2 node (i.e., from the E2-node, such as the O-CU, O-DU, etc.) and the O-RU (via the E2 node or directly).

For example, the collected data to temporarily deactivate one or more O-RU components may include related information for the corresponding O-RU(s), wherein the configurations, performance indicators and measurement reports (e.g., cell load-related information and traffic information, energy efficiency EE and/or energy consumption EC measurement reports, geolocation information, etc.) enable the identification the individual capabilities of the O-RU(s)(e.g., the O-RU's internal system architecture, the performance thereof, the functionality thereof, etc. to optimally control and/or configure the O-RU components).

The collected data (e.g., the measurement data for energy saving) may be used for the purpose of training (re-training) and inference of AI/ML models that assist EE/ES functions for optimizing energy efficiency EE and/or energy consumption EC towards the nRT-RIC through the SMO/Non-RT RIC framework assisted by machine learning (ML) techniques.

As set forth above, it is assumed herein that configurations, performance indicators and measurement reports (i.e., the data to perform an optimization of temporary deactivation of O-RU component(s)) collected from the E2 node (i.e., O-DU, O-CU, etc.) contain related information for the corresponding O-RU components (e.g., the O-RU capabilities of the physical/functional components to implement the advanced sleep modes).

According to an example embodiment, the collected data as set forth above may be collected via an O1-interface via the E2 node from an O-RU in accordance with the hierarchical O-RAN system architecture with and/or via the open FH M-Plane directly from the O-RU in accordance with the hybrid O-RAN system architecture.

For example, the collected data as set forth above may be collected via an E2-interface from the O-RU via an open FH M-Plane.

As a result, the SMO and NRT-RIC framework are configured to analyze the collected data from the E2 node (e.g., the E2-node such as the O-CU, O-DU, etc.) and/or O-RU to trigger the advanced sleep modes (ASMs).

In general, Energy Efficiency EE is defined as the relation between the useful output and energy/power consumption, and Energy Consumption EC is defined as an integral of power consumption over time.

Furthermore, the SMO and NRT-RIC framework are configured to formulate and/or provide optimization triggers, optimization targets (e.g., enable traffic shaping to elongate sleep modes on 50% peak power consumptions) and A1 policies (e.g., intent-based policies) to the nRT-RIC (e.g., via the O1 interface and/or A1 interface).

In addition, the SMO and NRT-RIC framework may be configured to, for example, train, retain, update, configure, etc. EE/ES AI/ML models in the NRT-RIC.

In an example embodiment, the SMO framework (i.e., the NRT-RIC) may be configured to activate and deploy EE/ES AI/ML model in the nRT-RIC.

Still referring to FIG. 4, the E2 node (e.g., the E2-node such as the O-CU, O-DU, etc.) of FIG. 1 is configured to report necessary cell configurations, performance indicators and measurement reports (e.g., cell load-related and traffic information, EE/EC measurement reports) and O-DU and/or O-RU capability of advance sleep modes to SMO via O1 interface and to nRT-RIC via E2 interface and the O1 interface.

Moreover, the E2 node (e.g., the E2-node) is configured to apply ES functions or execute advanced sleep modes on the O-RU based on policy (E2 policy command) or recommendation (E2 control command) from the nRT-RIC, respectively.

Furthermore, the E2 node (e.g., the E2-node) is configured to perform traffic shaping (i.e., intelligently scheduling) to converge symbols and/or slots from the time domain into the frequency domain to elongate a deactivation time period of the one or more O-RU components and/or to perform actions such as, for example, adjusting Remaining Minimum System Information (RMSI) broadcast intervals and common channels (e.g., the Physical Downlink Control Channel), aligning Discontinuous Reception (DRX) cycle of user entities (UEs) in the cell, utilizing multi-carrier based energy saving methods, etc.

The O-RU as illustrated for example in FIG. 1, is configured to report advanced sleep modes related capability information over the M-Plane to O-DU.

Moreover, in an example embodiment, the O-RU is configured to execute the transition from an active state to desired sleep mode as instructed by E2 node (i.e., the O-DU) via a CUS-Plane (i.e., to implement the temporary deactivation of O-RU components based on the type of advance sleep mode).

Furthermore, the O-RU is configured to report power consumption and sleep state related information to E2 node (i.e., the O-DU) and/or to the SMO Framework via open FH M-Plane according to the hybrid O-RAN system architecture.

Referring to FIG. 4, the SMO Framework and the E2 node, in order to prepare and execute the method for implementing the advanced sleep mode in the O-RAN may extract input data, which among other O1 related data, O2 related data, E2 related data, etc. available in O-RAN, may include load statistics per cell and per carrier (e.g., number of active users, average number of Radio Resource Control (RRC) connections, average number of scheduled active users per Transmission Time interval (TTI), Physical Resource Block (PRB) utilization, Downlink DL and/or Uplink UL Cell/User throughput, Precoding Matrix Indicator (PMI) reports and/or Channel State Information (CSI) reports, etc.

Moreover, the SMO Framework and the E2 node, in order to prepare and execute the method for implementing the advanced sleep mode in the O-RAN may also extract input data, such as latency statistics per cell (e.g., in case ultra-reliable low latency communications (URLLC) slices are involved, the latency may be utilized as defined in the EE definition, TS 28.554), capabilities of O-DU as related to advance sleep modes (e.g., O-DU capabilities due to specific network scenarios (e.g., traffic load) and network deployment as related to advance sleep modes), etc.

In addition, the O-RU in order to prepare and execute the method for implementing the advanced sleep mode in the O-RAN may extract input data, such as power consumption metrics including—among other power consumption metrics—, for example, the mean total and per carrier power consumption, the power consumption per type of advanced sleep mode. Moreover, the O-RU data may extract information on O-RU for supported advanced sleep modes along (i.e., capabilities of O-RU as related to the advance sleep modes (e.g., capabilities of the physical and functional components of O-RU as related to the advanced sleep modes). For example, the information on O-RU for supported advanced sleep modes may include transition times from sleep to active (e.g., including the cell site/O-RU input power needed for specific energy efficiency (EE) KPIs).

The extracted input data of the SMO Framework, the E2 node and O-RU as set forth above may be collected by the NRT-RIC and/or the nRT-RIC for processing the method for implementing the advanced sleep modes in the O-RAN.

Referring to FIG. 4, the communication between the NRT-RIC and nRT-RIC in order to prepare and execute the method for implementing the advanced sleep modes in the O-RAN includes output data, that among other O1 related data, O2 related data, A1 related data, etc. available in O-RAN, include output data that provide an O1 related configuration data (e.g., ES optimization triggers, ES optimization targets, etc.) and/or one or more A1 policies for the execution of advance sleep modes based on network operator (intend based) policy.

Moreover, the communication between the NRT-RIC to E2 node (i.e., the E2 node) in order to prepare and execute the method for implementing the advanced sleep modes in the O-RAN includes output data, such as E2 policy commands and/or E2 control commands that provide, for example, policy and/or guidance on the activation of traffic shaping (scheduling of slots and/or symbols) to minimize active slot Transmission Time interval (TTI) and/or symbol TTI, policy and/or guidance on execution of the type of ASM that refers, for example, to a hibernate sleep mode with an expected latency is higher than 10 ms to the one or more O-RU components, policy and/or guidance on the configuration for adjustment of the common channels (i.e., PDCCH) and Remaining Minimum System Information (RMSI). Furthermore, the E2 Node to O-RU.

To this end, the E2 policy commands and/or E2 control commands include policy and/or guidance on the activation of advanced sleep modes to achieve an optimal balance between system performance and energy savings.

Moreover, the communication between the E2 node (i.e., E2-node) to O-RU in order to prepare and execute the method for implementing the advanced sleep modes in the O-RAN includes output data, such as advanced sleep mode execution command over the CUS-Plan. For example, the advanced sleep mode execution command may include appropriate execution commands to allow the implementation of the advanced sleep mode that considers the capabilities of the O-RU and achieves an optimal balance between system performance and energy savings.

As a result, the O-RAN system architecture as configured in FIG. 4 realizes an implementation of one or more ASM types/levels considering the capability data of the O-RU and/or the O-DU and thereby enables abstraction levels of energy-saving modes that allow for optimizing the operational energy efficiency of the O-RU(s), while maintaining a high level of network performance with the entire O-RAN.

Figure 5:
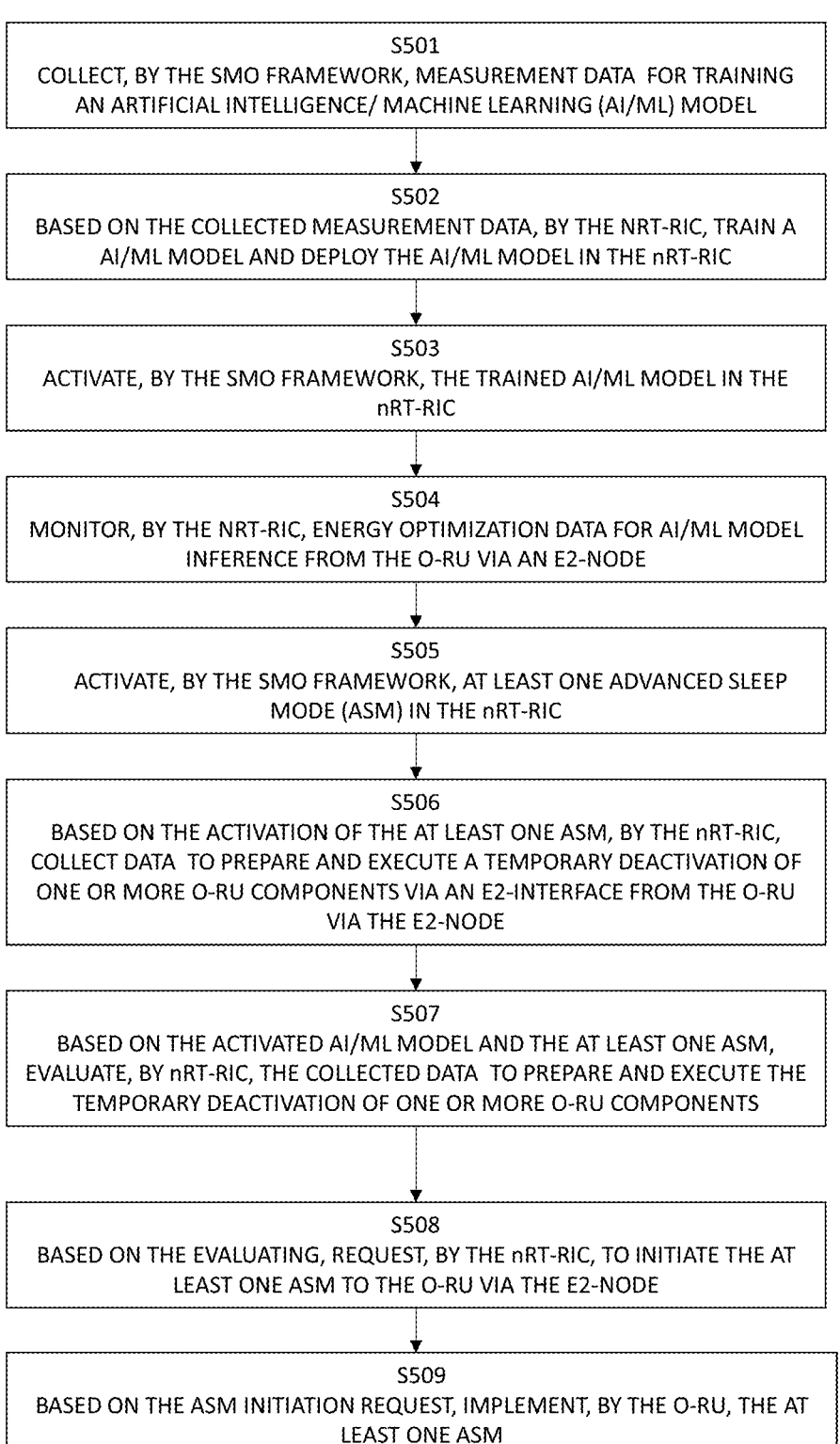
FIG. 5 illustrates a flow diagram of a method for implementing advanced sleep modes according to an embodiment.

FIG. 5 illustrates a flow diagram of a method for implementing advanced sleep modes according to an embodiment.

Referring to FIG. 5, the method for implementing advanced sleep modes may include functions such as a service management and orchestration (SMO) framework, a near-real-time radio access network (RAN) intelligent controller (nRT-RIC), a non-real-time radio access network (RAN) intelligent controller (NRT-RIC), an NRT-RIC framework in accordance with FIGS. 1 and 4. Moreover, said functions may be realized in a system for implementing advanced sleep modes in an open radio access network (O-RAN) that can comprise a memory storing instructions and at least one processor configured to implement the near-real-time radio access network (RAN) intelligent controller (nRT-RIC) and the service management and orchestration (SMO) framework, wherein the SMO framework comprising the non-real-time radio access network (RAN) intelligent controller (NRT-RIC), and wherein the at least one processor configured to execute the instructions according to the method for implementing advanced sleep modes in FIG. 5.

In step 501, the SMO framework collects measurement data required for training an artificial intelligence/machine learning (AI/ML) model.

For example, necessary cell configurations, performance indicators, measurement reports (e.g., cell load-related information and traffic information, energy efficiency EE and/or energy consumption EC measurement reports, geolocation information, etc.), etc. from the E2 node (i.e., from the E2-node, such as the O-CU, O-DU, etc.) and the O-RU (via the E2 node or directly).

In step 502, based on the collected measurement data, the NRT-RIC train (e.g., re-trains) an AI/ML model and deploys the AI/ML model in the nRT-RIC.

For example, the NRT-RIC retrieves the measurement data required for training an artificial intelligence/machine learning (AI/ML) model from the SMO framework via the NRT-RIC framework as set forth in FIG. 4.

In an example embodiment, the input data to train the AI/ML model may include the following measurement data to monitor energy consumption & energy efficiency EC/EE of one or more E2 Nodes and one or more O-RUs: Down Link Packet Data Convergence Protocol Service Data Unit DL PDCP SDU Data Volume per interface (Data Volume in DL delivered from O-CU-UP to O-DU, per public land mobile network PLMN, per quality of service QoS level, per slice, per F1-U interface, Xn-U interface, X2-U interface, Up Link Packet Data Convergence Protocol Service Data Unit UP PDCP SDU Data Volume per interface (Data Volume in UL delivered from O-CU-UP to O-DU, per public land mobile network PLMN, per quality of service QoS level, per slice, per F1-U interface, Xn-U interface, X2-U interface, Reference Signal Received Quality RSRQ measurement per Synchronization Signal Block SSB per cell, Reference Signals Received Power RSRP measurement per SSB per cell, Signal to Interference plus Noise Ratio SINR measurement per SSB per cell, energy consumption, power consumed by hardware component, transmit power, etc.

In step 503, by the SMO framework activates the trained AI/ML model in the nRT-RIC.

In step 504, the NRT-RIC monitors the energy optimization data for AI/ML model inference from the O-RU via the E2 node. For example, the NRT-RIC constantly (e.g., periodically or event-based) monitors the performance and energy consumption of the E2-node and the O-RU for inference. The performance and energy consumption (i.e., the optimization data) may include data such as cell load-related data and traffic information, EE/EC measurement reports, geolocation information, etc.

In step 505, the SMO framework activates at least one advanced sleep mode (ASM) in the nRT-RIC. For example, SMO may trigger the activation of at least one advanced sleep mode (ASM) in the nRT RIC via the O1 interface. Alternatively, the NRT-RIC may provide policies via the A1 interface guiding the nRT-RIC to apply an EE/ES function to activate the at least one advanced sleep mode (ASM).

Moreover, in step 506, based on the activation of the at least one ASM, the nRT-RIC collects data required to prepare and execute a temporary deactivation of one or more O-RU components via an E2-interface from the O-RU via the E2 node.

For example, data required to prepare and execute a temporary deactivation of one or more O-RU components may include E2 node data, such as latency statistics per cell (e.g., in case ultra-reliable low latency communications (URLLC) slices are involved, the latency may be utilized as defined in the EE definition, TS 28.554), capabilities of O-DU as related to advance sleep modes (e.g., O-DU capabilities due to specific network scenarios (e.g., traffic load) and network deployment as related to advance sleep modes), etc.

Moreover, the data required to prepare and execute a temporary deactivation of one or more O-RU components may include O-RU data, such as, for example, power consumption metrics including among other power consumption metrics, for example, the mean total and per carrier power consumption, the power consumption per type of advanced sleep mode. Moreover, the O-RU data may extract information about O-RU for supported advanced sleep modes (i.e., capabilities of O-RU as related to the advanced sleep modes). For example, the information on O-RU for supported advanced sleep modes may include transition times from sleep to active (e.g., including the cell site/O-RU input power needed for specific energy efficiency (EE) KPIs).

In step 507, based on the activated AI/ML model and the at least one ASM, the nRT-RIC evaluates the collected data required to prepare and execute the temporary deactivation of one or more O-RU components. For example, based on an AI/ML inference in the nRT-RIC, the nRT-RIC considers the optimization policies as provided in step 505 and, analyses the collected data in step 506 to prepare and execute the temporary deactivation of one or more O-RU components.

In step 508, based on the evaluation, the nRT-RIC requests the initiate the at least one ASM to the O-RU via the E2 node. For example, the nRT-RIC generates an E2 control command to request to initiate the at least one ASM to the E2 node that complies with the O-RU's capabilities and/or an E2 policy command for an energy savings (ES) function to be applied to the E2 node that complies to the O-RU's capabilities. In this case, the nRT-RIC may send the E2 control command and/or the E2 policy command to the E2 node via the E2 interface.

For example, the E2 policy commands and/or the E2 control commands may provide, for example, guidance and and/or commands to implement optimization policies to request the E2-node to initiate at least advanced sleep mode (ASM), by activating the intelligent scheduling features (e.g., scheduling of slots and/or symbols) to converge symbols or slots, adjusting the RMSI broadcast intervals and the common channels, aligning the DRX cycle of UEs in the cell, utilizing multi-carrier based energy saving methods to further extend the depth and frequency of sleep modes (i.e., elongate the inactive periods of the O-RU by clearing (rescheduling) transmission symbols and/or slots in the time domain to transmission blocks (i.e., Resource Blocks (RBs) for symbols and/or Resource Block Group (RBG) for slots) in the frequency domain in accordance to a variety of types/levels of advanced sleep modes without influences other transmission to the O-RU).

According to one example embodiment, the E2 policy commands and/or the E2 control commands may provide, for example, guidance and and/or commands to activate the intelligent scheduling features (e.g., scheduling of slots and/or symbols) to minimize active slot TTI and/or symbol TTI, policy and/or guidance on execution of the type of ASM that refers to the hibernate sleep mode with an expected latency is higher than 10 ms to the one or more O-RU components, policy and/or guidance on the configuration for adjustment of the common channels (i.e., PDCCH) and the Remaining Minimum System Information (RMSI).

To this end, the E2 policy commands and/or E2 control commands include policy and/or guidance on the activation of advanced sleep modes to achieve an optimal balance between system performance and energy savings.

In step 509, based on the ASM initiation request, the O-RU implements the at least one ASM. For example, the E2 node (i.e., E2-node) may generate an advanced sleep mode execution command to request the implementation over the CUS-Plan. For example, the advanced sleep mode execution command may include appropriate execution commands to allow the implementation of the advanced sleep mode that considers the capabilities of the O-RU and achieves an optimal balance between system performance and energy savings.

As a result, while taking into account the capability data of the O-RU and/or the O-DU along with the data to temporarily deactivate one or more O-RU components, the implemented type of ASM (i.e., among the multiple types/levels of ASM) allows an optimal operational energy efficiency of the O-RU(s), while maintaining a high level of network performance with the entire O-RAN.

FIG. 6 illustrates a flow diagram of a method for collecting the data to temporarily deactivate one or more O-RU components based on the activation of at least one ASM, according to another embodiment.

Referring to FIG. 6, in step 601, the nRT-RIC sends a data collection request for energy saving via an E2 interface to the E2 node.

In step 602, the E2 node receives the data collection request for energy saving from the nRT-RIC.

In step 603, the E2 node collects the data to temporarily deactivate the one or more O-RU components from the O-RU via the open FH M-Plane interface.

In step 604, the E2 node sends the collected data to temporarily deactivate the one or more O-RU components via the E2 interface to the nRT-RIC.

As a result, the method in FIG. 6 allows for the collection of necessary data to temporarily deactivate the one or more O-RU components extracted from input data by the SMO framework, the E2 node as set forth in FIG. 4 that provides the optimum accuracy to evaluate and request the initiation of most suitable type of advanced sleep mode to for optimal energy efficiency of the operation of the O-RU(s), while maintaining a high level of network performance with the entire O-RAN.

FIG. 7A illustrates a flow diagram of a method for evaluating the collected data to temporarily deactivate the one or more O-RU components according to an embodiment.

Referring to FIG. 7A, in step 701A, the nRT-RIC receives the collected data to temporarily deactivate the one or more O-RU components from the E2 node via the E2 interface.

In step 702A, based on the AL/ML model inference, the nRT-RIC generates at least one E2 control command to request to initiate the at least one ASM to the E2 node that complies with the O-RU's capabilities.

In step 703A, the nRT-RIC sends the at least one E2 control command to the E2 node (e.g., via the E2 interface).

FIG. 7B illustrates a flow diagram of a method for evaluating the collected data to temporarily deactivate the one or more O-RU components according to another embodiment.

Referring to FIG. 7B, in step 701B, the nRT-RIC receives the collected data to temporarily deactivate the one or more O-RU components from the E2 node via the E2 interface.

In step 702B, based on the AI/ML model inference, the nRT-RIC generates at least one E2 policy command for an energy savings (ES) function to be applied to the E2 node that complies with the O-RU's capabilities;

In step 703B, the nRT-RIC sends the at least one E2 policy command to the E2 node (e.g., via the E2 interface).

As a result, according to the embodiment as set forth in FIGS. 7A and 7B, based on evaluating the collected data to temporarily deactivate the one or more O-RU components, the AI/ML model inference at the nRT-RIC provides one or more E2 control command and/or at least one E2 policy command for the E2 node to allow an optimal operational energy efficiency of the O-RU(s), while maintaining a high level of network performance with the entire O-RAN.

FIG. 8 illustrates a flow diagram of a method for implementing advanced sleep modes according to an embodiment. Referring to FIG. 8, in step 801, based on the implementation, the NRT-RIC receives, via the SMO framework, implementation feedback comprising a performance analysis of the AL/ML model.

In step 802, the NRT-RIC analyzes the performance of the AI/ML model in the nRT-NIC.

In step 803, the NRT-RIC determines that at least one predetermined performance objective is not achieved based on the performance of the AI/ML model.

In step 805, the NRT-RIC initiates a fallback mechanism to pertain to the at least one predetermined performance objective.

For example, the NRT-RIC initiates a fallback mechanism that may include an update of optimization triggers, optimization targets (e.g., enable traffic shaping to elongate sleep modes on 50% peak power consumptions) and A1 policies (e.g., intent-based policies) to the nRT-RIC (e.g., via the O1 interface and/or A1 interface).

As a result, a method for implementing advanced sleep modes according to FIG. 8 provides a determination to initiate a fallback mechanism related to the at least one predetermined performance target (e.g., to use a more appropriate advanced sleep mode) based on analysis of the performance of the AI/Mb model in the NRT-NIC. The initiation of the fallback mechanism (i.e., a close-loop control) allows adjustment of the ASM type/level to respond to changing O-RAN conditions in a closed-loop manner to achieve optimal operational energy efficiency of the O-RU (s) while maintaining a high level of network performance of the entire O-RAN.

Figure 9:
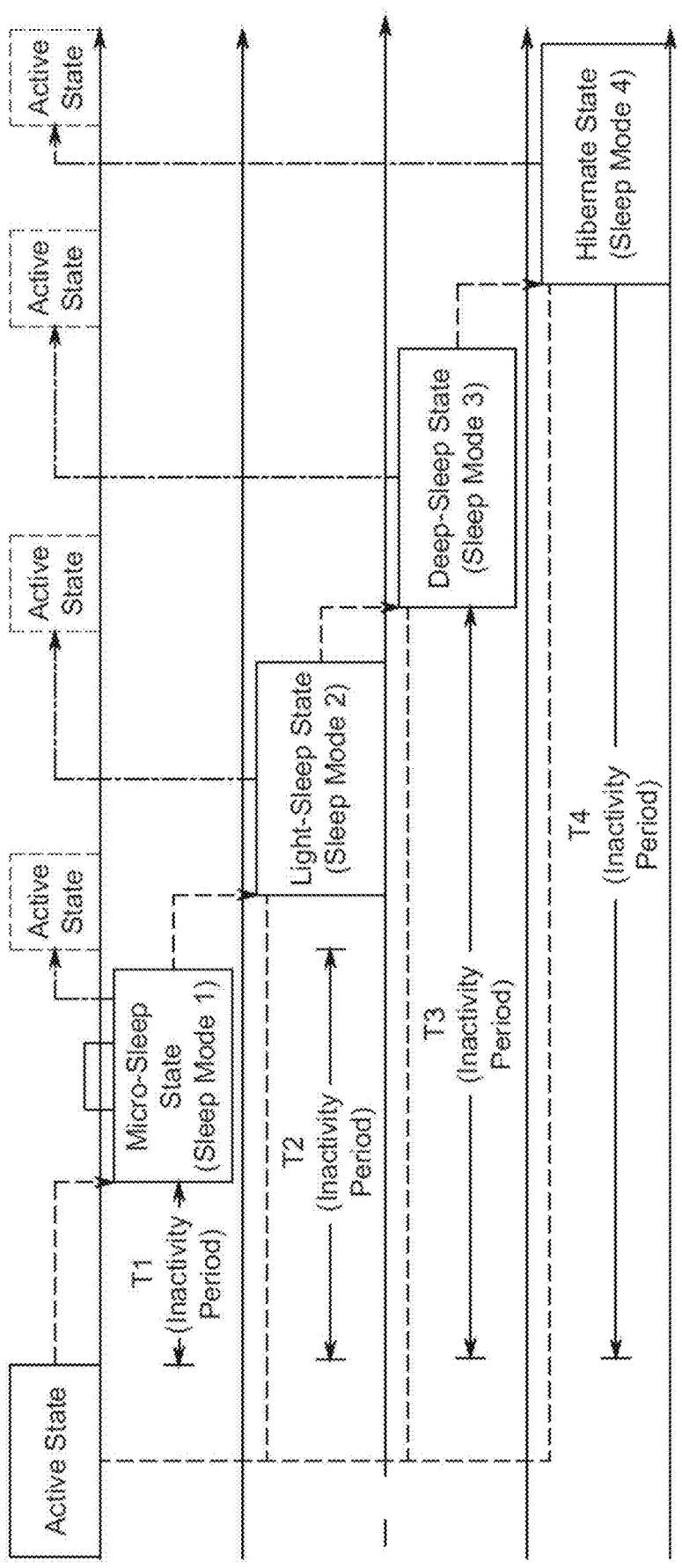
FIG. 9 shows multiple types of advanced sleep modes according to an embodiment.

FIG. 9 shows multiple types of advanced sleep modes (i.e., ASM types/levels) according to an embodiment. Referring to FIG. 9, based on types of control methodology to deactivate O-RU components and the deactivation time scale various types of (advanced) sleep modes (ASMs) can be implemented. These ASMs may cover most of the O-RU equipment (e.g., (i.e., can temporarily deactivate O-RU components such as, for example, physical and functional components of the O-RU).

Moreover, though some of the multiple vendor O-RAN FH based O-RUs may not necessarily need to support all types of sleep modes, the O-RU specifications (the capabilities of the O-RU) may need to allow for various types of advanced sleep modes (i.e., the O-RU capabilities must support the types of control methodology the deactivation time scale(s) used by the multiple types of (advanced) sleep modes (ASMs) in order to allow implementation.

To this end, the nNRT-RIC and/or the O-DU may obtain prior knowledge of the O-RU specifications (the capabilities of the O-RU) to apply ASMs that are supported by the O-RU.

As a result, the O-DU may execute (applies) various types of ASMs in the O-RU through CUS-Plane indicating (messaging), for example, the number of slots for which O-RU (i.e., the O-RU components) can go into sleep.

According to a first embodiment, a first type of ASM may enable a micro sleep mode (i.e., ASM 1) on a symbol to slot-based time duration (i.e., a temporary deactivation of the O-RU components within a symbol to slot-based time duration). For example, ASM 1 may be initiated (e.g., guided) from the nRT-RIC to the O-DU. To this end, the nRT-RIC may send an E2 control command and/or an E2 policy command to the O-DU, wherein the O-DU may instruct the O-RU to implement the ASM 1.

According to ASM 1 (i.e., the micro sleep mode), in case the E2 node (e.g., a gNB) does not need to operate TX/RX information within the next few orthogonal frequency division multiplexing (OFDM) symbols (i.e., Truncated OFDM (TOFDM)-Symbol<T≤Slot [ms]), the E2 node may communicate the capability to apply ASM 1 (i.e., micro sleep mode) to the nRT-RIC, and the nRT-RIC sends an E2 control command and/or an E2 policy command to E2 node, wherein the E2 node instructs the O-RU that, for example, Radio Frequency (RF) transceivers can be turned off for the prescribed period a set forth above (e.g. at the time (re-) initiating the O-RU and/or the O-DU after powering up and/or maintenance). Alternatively, the nNRT-RIC provided an E2 policy command which guides the O-DU, and the O-DU instructs the O-RU according to the E2 policy command.

To this end, the sleep duration for ASM 1 (i.e., the micro sleep mode) would be based on O-RU capability to support the lowest granularity of sleeping intervals (i.e., the finest subdivision of deactivation states on a symbol to slot-based time duration). The lowest granularity of sleeping intervals demands the highest level of O-RU capabilities from the O-RU components to support the micro sleep mode).

As a result, the O-RU's capability to support the micro sleep mode allows the O-DU to make more informed decisions (e.g., decisions resulting in better energy efficiency) on the application of intelligent scheduling features (e.g., traffic shaping such as data convergence of symbols and/slots from the time domain into frequency domain) to conserve energy.

The ASM 1 (i.e., the micro sleep mode) has the advantage that in accordance with the O-RU capability and O-DU capability to detect and respond to subtle changes in traffic patterns, the O-RU capabilities to temporarily deactivate the O-RU components within symbol to slot-based time duration enable the O-DU to take more precise energy saving measures, rather than relying on broad, blanket policies for energy saving.

According to a second embodiment, another type of ASM may enable a light sleep mode (i.e., ASM 2) on an L-Slot(s) based time duration (one slot to 10 ms) (i.e., temporary deactivation of the O-RU components within an L-Slots based time duration). For example, the light sleep mode (i.e., ASM 2) may be initiated (e.g., guided) from nRT-RIC to O-DU. To this end, the nRT-RIC may send an E2 control command and/or an E2 policy command to the O-DU. According to the light sleep mode (i.e., ASM 2), in case the E2 node (e.g., a gNB) does not need to operate TX/RX information within the next L Slots (e.g., Slot≤T≤10 ms), the E2 node may communicate it's the capability to apply the light sleep mode (i.e., ASM 2) to nRT-RIC. The nRT-RIC sends an E2 control command and/or an E2 policy command to the E2 node, wherein the E2 node instructs the O-RU that, for example, Radio Frequency (RF) transceivers and additional hardware components (i.e., other physical O-RU components) can be turned off for the prescribed period as set forth above. Alternatively, the nNRT-RIC provided an E2 policy command which guides the O-DU, and the O-DU instructs the O-RU according to the E2 policy command.

To this end, the sleep duration for ASM 2 (i.e., the light sleep mode) is based on an O-RU capability level (i.e., O-RU capability to comply with a temporary deactivation of the O-RU's (physical) components) that to support the sleep duration (deactivation interval) between one slot to 10 ms.

As a result, in the case of the ASM 2 (i.e., the light sleep mode), the power consumption of the O-RU components is typically lower compared to that of the micro sleep mode (i.e., ASM 1).

Moreover, according to an example embodiment, the light sleep mode may be implemented via transmission blanking when there is neither a Synchronization Signal Block (SSB) in the downlink (DL) nor in the Physical Random Access Channel (PRACH) or there are no other uplink (UL) signals to be transmitted/received.

According to a third embodiment, another type of ASM may enable a deep sleep mode (i.e., ASM 3) on an M-Slot(s) based duration time (Radio Frame to 100 ms) (i.e., temporary deactivation of the O-RU components within an M-Slot (s) based time duration). For example, the deep sleep mode (i.e., ASM 3) may be initiated (e.g., guided) from nRT-RIC to the O-DU and the O-RU. To this end, the nRT-RIC may send an E2 control command and/or an E2 policy command to the O-DU and the E2 node may provide an O-RU implementation instruction command to the O-RUs.

According to the deep sleep mode (i.e., ASM 3), in case the E2 node (e.g., a gNB) does not need to operate TX/RX information within the next M Slots (e.g., 10 ms≤T≤100 ms), the E2 node may communicate it's the capability to apply the deep sleep (i.e., the ASM 3) to nRT-RIC. The nRT-RIC sends an E2 control command and/or an E2 policy command to the E2 node, wherein the E2 node instructs the O-RU to implement the deep sleep mode (i.e., ASM 3).

Alternatively, the nNRT-RIC provided an E2 policy command which guides the O-DU, and the O-DU instructs the O-RU according to the E2 policy command.

For example, by initiating the deep sleep mode (i.e., ASM 3), additional hardware components (i.e., other physical O-RU components) can be turned off for the prescribed period as set forth above. However, in accordance with the deep sleep mode (i.e., ASM 3) some hardware components of the O-RU such as timing circuitry must be kept on standby or maintained active for allowing the O-RU a fast transition to an active state (i.e., to instantly rollback). The power consumption of the deep sleep mode (i.e., ASM 3) is lower compared to that of light sleep mode (i.e., ASM 2).

The sleep duration for deep sleep mode (i.e., ASM 3) may be based on the O-RU's capability to support sleep duration (i.e., deactivation duration) between a Radio Frame to 100 ms. According to the relatively long deactivation duration, the deep sleep mode (i.e., ASM 3) requires coordination with other neighboring cells since user experience would be affected if a cell is turned off for the deactivation period in accordance with ASM 3. Thus, the O-DU may need to schedule and send an O-RU implementation instruction command to the O-RUs.

According to a fourth embodiment, another type of ASM may enable a hibernate sleep mode (i.e., ASM 4) on an N-Slot(s) based duration time (e.g., 100 ms to several seconds) (i.e., temporary deactivation of the O-RU components within an N-Slot(s) based time duration). For example, the type of ASM that enables hibernate sleep (i.e., the ASM 4) may be initiated (e.g., guided) from nRT-RIC to the O-DU and the O-RU. To this end, the nRT-RIC may send an E2 control command and/or an E2 policy command to the O-DU and the E2 node may provide an O-RU implementation instruction command to the O-RUs.

According to the hibernate sleep mode (i.e., ASM 4), in case the E2 node (e.g., a gNB) does not need to operate TX/RX information within the next N Slots (e.g., 100 ms to several seconds), the E2 node may communicate the capability to apply the deep sleep (i.e., ASM 3) to nRT-RIC. The nRT-RIC sends an E2 control command and/or an E2 policy command to the E2 node, wherein the E2 node instructs the O-RU to implement the hibernate sleep mode (i.e., ASM 4).

For example, by initiating the hibernate sleep mode (i.e., ASM 4), most of the hardware components (i.e., almost all physical O-RU components) can be turned off for the prescribed period as set forth above. However, in accordance with the hibernate sleep mode (i.e., ASM 4) some hardware components of the O-RU such as timing circuitry must be kept on standby or maintained active to allow the O-RU a fast transition to an active state (i.e., to instantly rollback). The power consumption of the hibernate sleep mode (i.e., ASM 4) is lower compared to that of deep sleep mode (i.e., ASM 3), wherein sleep durations greater than 1000 ms may not be precluded.

The sleep duration for hibernate sleep mode (i.e., ASM 4) may be based on the O-RU's capability to support a sleep duration (i.e., deactivation duration) between 100 ms to several seconds. According to the relatively long deactivation duration, the hibernate sleep mode (i.e., ASM 4) requires coordination with other neighboring cells since user experience would be affected if a cell is turned off for the deactivation period in accordance with ASM 4. Thus, the O-DU may need to schedule and send an O-RU implementation instruction command to the O-RUs.

Referring to FIG. 9, the level of sleep (savings in power consumption) is ascending from level 1 to level 4 in accordance with ASM 1 to ASM 4.

FIG. 10 illustrates a method for scheduling at least one symbol to minimize the number of symbols in the time domain according to an embodiment. The method for scheduling at least one symbol to minimize the number of symbols in the time domain is associated with the advanced sleep modes, for example, as set forth in FIG. 9.

Referring to FIG. 10, the symbols can be allocated in Resource Blocks (RBs) over various frequency bands in the frequency domain. For example, the symbols can be allocated over RB0 to RBn in the frequency domain. Moreover, in the time domain, the symbols may be allocated over time (i.e., symbol durations D such as a symbol TTI). For example, the symbols are allocated over symbol durations (e.g., D 0 to D 13), wherein a symbol duration has a predetermined time period (e.g., a symbol TTI).

In order to minimize the number of symbols in the time domain (e.g., the symbols in the symbol sequence according to D0 to D13), the symbols can be relocated to Resource Blocks (e.g., RB0 to RBn in respective frequency bands).

For example, the symbols of a Physical Downlink Control Channel (PDCCH) are allocated over RB0 to RB7 in the frequency domain.

Moreover, the symbols of the Physical Downlink Shared Channel (PDSCH) are allocated in 3 Resource Blocks (RBs) over a symbol sequence according to D0 to D13. For energy saving, the active time of O-RU components can be reduced by converging the symbols from the time domain to the frequency domain. To this end, the symbol sequence D0 to D13 of the PDSCH symbols can be relocated to, for example, RB0 to RB6 in the frequency domain. As a result, the time domain sequence of PDSCH and PDCCH can be cleared (i.e., scheduled transmission can be emptied) by 6 symbols to the remaining 7 consecutive symbols for PDCCH and PDSCH broadcasting. As a result, the cleared 6 symbols in time domain with no data may be used as energy saving slots (i.e., slots for which one or more O-RU components are deactivation).

As a result, the convergence of the at least one symbol from the time domain into the frequency domain elongates the deactivation time period of the one or more O-RU components. The extension of the deactivation time period enables the E2 node (e.g., a gNB) to recognize a state in which the E2 node does not need to operate TX/RX information within the number of relocated orthogonal frequency division multiplexing (OFDM) symbols (i.e., Truncated OFDM (TOFDM)-Symbol<T≤ES Slot [ms]) more often. This has the advantage that, the E2 node may communicate the capability to apply, for example, ASM 1 and initiates the temporary deactivation of the O-RU components as set forth in FIG. 9 more frequently in order to converse energy, while maintaining a high level of network performance with the entire O-RAN.

FIG. 11 illustrates a method for scheduling at least one slot to minimize the number of slots in the time domain according to an embodiment.

Referring to FIG. 11, the slots can be allocated in Resource Block Groups (RBGs) over various frequency bands in the frequency domain. For example, the slots can be allocated over RBG0 to RBGn in the frequency domain. Moreover, in the time domain, the slots may be allocated over time (i.e., slot time periods such as slot TTI). For example, the slots are allocated over slot durations (e.g., Slot 0 to Slot 10), wherein a slot duration has a predetermined time period (e.g., a slot TTI).

In order to minimize the number of slots in the time domain (e.g., the slots in the slot sequence according to Slot 0 to Slot 10), the slots can be relocated to Resource Block Groups (e.g., RBG0 to RBGn in respective frequency bands).

According to an example, in RBG1 to RBG2 of Slot 0 Synchronization Signal Block-Master Information Block (SSB-MIB) slots are scheduled to be transmitted. In RBG3 to RBG5 of Slot 1 System Information Block Type 1 (SIB1) slots are scheduled to be transmitted. In Slots 2 and 3 Physical Downlink Shared Channel (PDSCH) slots are scheduled to be transmitted in RBG1 and RBG2.

Not limited to this example, the concept of converging slots from the time domain into the frequency domain may be illustrated, for example, by the slots of the Physical Downlink Shared Channel (PDSCH) which are scheduled to be transmitted in Slots 2 and 3 (i.e., otherwise empty Slots 2 and 3). In this case, the slots can be converged (i.e., can be rescheduled) to be transmitted in RBG1 to RBG2 of Slots 4 and 5, wherein Slots 4 and 5 have no transmission load in RBG1 to RBG2 (i.e., RBG1 and RBG2 in Slot 4 and Slot 5 are empty). As a result, Slots 2 and 3 can be cleared from transmission load in the time domain as well as frequency domain and used for the activation of an ASM (i.e., the temporary deactivation of the one or more O-RU component (s)).

Moreover, other S1 Block slots may be scheduled to be transmitted in RBG3 to RBG4 of Slot 4 and Slot 5. These slots are not affected by the rescheduling as set forth above.

In a second example, the concept of converging slots from the time domain into the frequency domain may be illustrated, for example, by slots of a Physical Downlink Shared Channel (PDSCH) which are scheduled to be transmitted in RBG5 over a sequence of Slots 7 to 10. Slots 7 and 8 have no transmission load other than the PDSCH broadcasting slots. In order to clear Slots 7 and 8, the PDSCH slots can be rescheduled (i.e., converged) to RBG2 and RBG3 of Slot 9 and Slot 10, respectively. As a result, Slots 7 and 8 can be cleared from transmission load in the time domain as well as frequency domain and used for the activation of an ASM (i.e., the temporary deactivation of the one or more O-RU component(s)).

Referring to FIGS. 10 and 11, the symbol scheduling and the slot scheduling can be complimented by the various traffic shaping techniques (i.e., intelligent scheduling features). These intelligent scheduling features are applied to make the symbol scheduling and/or the slot scheduling, as set forth in FIGS. 10 and 11, more flexible (i.e., adjust the time durations (symbol or slot durations) of transmission to clear (empty) the maximum number of symbols or slots in the time domain without influence on other transmissions scheduled in parallel RBs or RBGs, respectively.

In a first traffic shaping example (i.e., according to a first intelligent scheduling feature), the base station (e.g., an O-RU) may dynamically adjust the number of PFs (Paging Frame) sent within a paging cycle (e.g., the paging cycle is referred to as time interval T in a standard PF). For example, reduce the number of PFs within the paging cycle when the O-RAN is operated under light or no load (i.e., low utilization of the O-RAN). Alternatively, increase (rollback) the number of PFs within the paging cycle when the network load is normal (i.e., normal utilization of the O-RAN).

As a result, the dynamic adjustment of paging frames has the advantage that it reduces symbols and slots in the time domain, by reducing the number of PFs within the paging cycle, thereby making it easier to reschedule (converge) symbols and slots from the time domain to the frequency domain to clear (empty) the maximum number of symbols or slots in the time domain without influence on other transmissions scheduled in parallel RBs or RBGs.

In a second traffic shaping example (i.e., according to a second intelligent scheduling feature), the base station (e.g., O-RU) may dynamically adjust SSB periodicity. To this end, the O-DU and or O-RU dynamically adjust the periodicity of SSB from 5 ms to 120 ms based on traffic load and performance-related KPI's requirements such as latency, user throughput, etc.

As a result, the dynamic adjustment of SSB periodicity may provide the optimal time duration to fit into respective RB and/or RBGs in order to converge (reschedule) the SSB transmission from the respective symbols and/or slots in the time domain to RB and/or RBGs of other symbols or and/or slots in the time domain in order to clear (empty) the maximum number of symbols or slots in the time domain without influence on other transmissions scheduled in parallel RBs or RBGs.

In a third traffic shaping example (i.e., according to a third intelligent scheduling feature), the base station (e.g., O-RU) may dynamically adjust the Remaining Minimum System Information (RMSI). To this end, for example, the O-RU may dynamically adjust the periodicity of the RMSI and/or other System Information (SI) based on traffic load and performance-related KPI requirements such as latency and user throughput.

As a result, the dynamic adjustment of the periodicity of the RMSI and/or other System Information (SI) may provide the optimal periodicity of transmitting the RMSI and/or the other System Information (SI) based on the O-RAN utilization in order to make place for symbols and slots to be rescheduled to respective RBs and/or RBGs in order to converge (reschedule) the respective symbols and/or slots in the time domain to RBs and/or RBGs of other symbols or and/or slots in the time domain in order to clear (empty) the maximum number of symbols or slots in the time domain without influence on other transmissions scheduled in parallel RBs or RBGs.

In a fourth traffic shaping example (i.e., according to a fourth intelligent scheduling feature), the base station (e.g., O-RU) may dynamically adjust common channel periodicity. To this end, for example, the O-RU may dynamically adjust the periodicity of the Physical Random Access Channel (PRACH) and/or other common channels such as the physical uplink control channel (PUCCH) (e.g., Channel State Information (CSI) and other reporting information) based on traffic load and performance related KPI requirements such as latency and user throughput.

As a result, the dynamic adjustment of the periodicity of the RMSI and/or other System Information (SI) may provide the optimal periodicity of transmitting the RMSI and/or the other System Information (SI) based on the O-RAN utilization in order to make place for symbols and slots to be rescheduled to respective RBs and/or RBGs in order to converge (reschedule) the respective symbols and/or slots in the time domain to RBs and/or RBGs of other symbols or and/or slots in the time domain in order to clear (empty) the maximum number of symbols or slots in the time domain without influence on other transmissions scheduled in parallel RBs or RBGs.

In a fifth traffic shaping example (i.e., according to a fifth intelligent scheduling feature), the base station (e.g., O-RU) may dynamically adjust the Uplink Scheduling Request (SR). To this end, for example, the O-RU may dynamically adjust Uplink SR periodicity based on ES policy and user performance requirements.

As a result, the dynamic adjustment of the Uplink SR periodicity may optimize the periodicity of transmitting the Uplink SR in order to make place for symbols and/or slots to be rescheduled to respective RBs and/or RBGs in order to converge (reschedule) the respective symbols and/or slots in the time domain to RBs and/or RBGs of other symbols or and/or slots in the time domain in order to clear (empty) the maximum number of symbols or slots in the time domain without influence on other transmissions scheduled in parallel RBs or RBGs.

In a sixth traffic shaping example (i.e., according to a sixth intelligent scheduling feature), the base station (e.g., O-RU) may dynamically synchronize the Discontinuous Reception (DRX) cycle of user entities (UEs) in the cell. To this end, the O-DU scheduling mechanisms synchronize the Discontinuous Reception (DRX) cycle of user entities (UEs) for minimizing O-RU awake time (i.e., allow a maximum level of empty symbols/slots to enable, for example, a deep sleep mode such as ASM 3). As a result, synchronization of the Discontinuous Reception (DRX) cycle of user entities (UEs) enables a minimum active time of the O-RU (i.e., the O-RU components) and optimal energy efficiency due to the extended deactivation of the O-RU components.

In a seventh traffic shaping example (i.e., according to a seventh intelligent scheduling feature), the base station (e.g., O-RU) may shift the traffic of O-RU's one or more carriers to one or more other carriers according to multi-carrier scenarios. To this end, the O-DU scheduling mechanisms may apply multi-carrier scenarios to the respective one or more other carriers to extend the deactivation period of O-RU components as scheduled by the O-RU. As a result, O-DU scheduling mechanisms allow a maximum sleep mode duration and a transition to deeper sleep modes (e.g., from a deep sleep mode (ASM 3) to a hibernate sleep mode (ASM 4)).

As a result, the intelligent scheduling features (e.g., the first to seventh traffic shaping examples) allow an implementation of the deepest possible (optimal) ASM level causing the longest deactivation of the one or more O-RU components and the implementation of that optimal ASM at the lowest level of granularity of sleeping intervals (i.e., the finest subdivision of deactivation states on a symbol to slot-based time duration). This has the advantage that optimizes the abstraction levels of energy-saving modes that allow an optimal operational energy efficiency of the O-RU (s), while maintaining a high level of network performance with the entire O-RAN.

Referring to FIG. 12A to FIG. 16, the method for implementing advanced sleep modes (ASMs) in the O-RAN enables ASM energy savings functions in the O-RAN. To this end, the nRT-RIC, based on said ASM energy savings functions, applies configuration changes to 0-DU and/or O-RU components and generates control actions and policy settings (e.g., E2 control commands and/or E2 policy commands) with AI/ML-based solutions. For example, the nRT-RIC provides an AI/ML-based E2 policy command to the E2 node (i.e., the O-DU), wherein the O-DU converts the policy into an O-RU implementation command to instruct the O-RU to enforce (i.e., apply and implement) the ASM configurations as provided from the nRT-RIC.

Moreover, the nRT-RIC controls the application of the ASMs to the O-DU and/or O-RU. The E2-node and O-RU configure the respective components (e.g., physical and functional O-RU components) and enforce the execution control actions (e.g., E2 control commands, O-RU implementation command) and enforcement policies (e.g., E2 policy commands).

The SMO and NRT-RIC framework formulate policies to trigger and guide ES optimization in the nRT-RIC.

Referring to FIG. 12A to FIG. 16, the method for implementing advanced sleep modes (ASMs) starts once the O-RAN is operational (i.e., one the A1 interface connectivity between the NRT-RIC and nRT-RIC, O1 interface connectivity between the SMO, NRT-RIC and the E2 node, the E2 interface connectivity between the nRT-RIC and the E2 node and the open FH M-Plane interface connectivity between the higher layer network functions (SMO, NRT-RIC) and the lower layer network functions (O-DU and/or O-RU) is established.

For example, the open FH M-Plane interface connectivity may be established between the E2 node(s) and O-RU(s) (i.e., the open FH M-Plane connectivity according to hierarchical O-RAN architecture) or between O-RU(s) and SMO (i.e., the open FH M-Plane connectivity according to the hybrid O-RAN architecture).

Furthermore, according to the status of the operational O-RAN, the nRT-RIC has knowledge about overlapping carrier(s)/cell(s) and the coverage of said carriers/cells (e.g., which carrier/cell is a coverage layer, and which is a capacity layer). Moreover, according to the status of the operational O-RAN, the nRT-RIC obtained (performance) targets (e.g., performance policies/objectives) as provided by the NRT-RIC framework and/or SMO framework.

To this end, a network operator may set performance targets for the ES function(s) in the NRT-RIC (i.e., predetermined performance parameters for EE/ES within the O-RAN, for example, one or more predetermined performance objectives for EE/EC within the O-RAN). The targets in the NRT-RIC may be formulated in a respective A1 policy.

As a result, the method for implementing an ASM may start when a network operator enables the collect and control function within the SMO framework (i.e., an optimization rApp) along with an initial AI/ML model.

Furthermore, based on the performance targets the nRT-RIC obtained capability data of O-DU and/or O-RU components for supporting the implementation of the ASMs in order to fulfill the performance targets as set forth above.

Figure 12A:
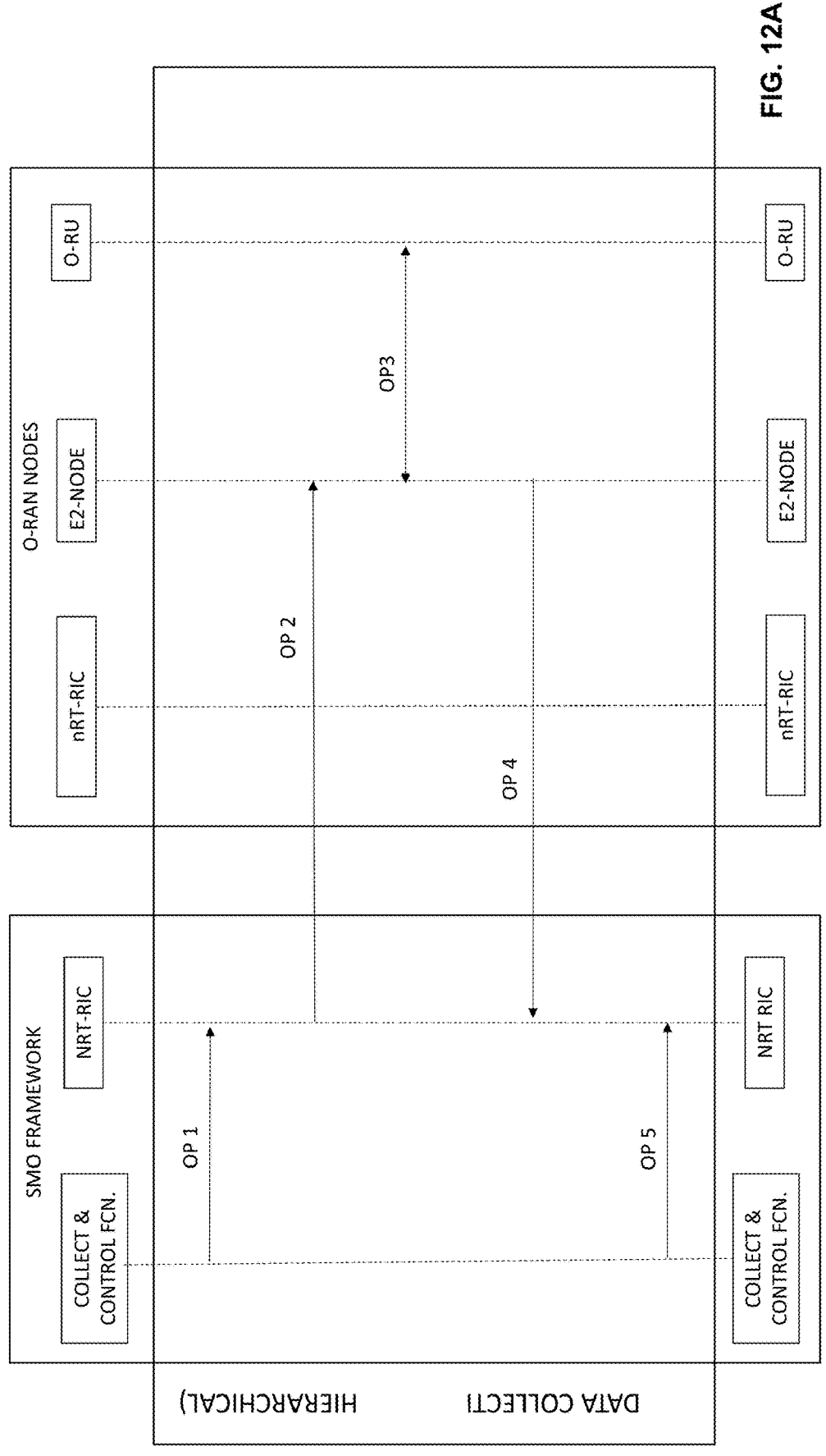
FIG. 12A illustrates a method for collecting data via an O1 interface in hierarchical O-RAN architecture according to an embodiment.

FIG. 12A illustrates a method for collecting data via an O1 interface in hierarchical O-RAN architecture according to an embodiment. Referring to FIG. 12 A, operations 1 to 5 illustrate the data collection of the method for implementing ASM in a hierarchical O-RAN architecture. In operation 1, the collect and control function within the SMO framework (e.g., a rApp) requests to collect measurement data for training to the AI/ML model (e.g., in the NRT-RIC) via the O1 interface.

In operation 2, upon receiving the request from SMO framework and/or NRT-RIC framework, the E2 node (i.e., E2 node such as O-CU, O-DU, etc.) requests the measurement data from O-RU via the open FH M-Plane.

In operation 3, the O-RU sends the measurement data via the open FH M-Plane interface to the E2 node. In an embodiment, the measurement data may comprise status and/or capability data of the O-RU for formulating a target for ES function(s) comprising ASM functionality.

In operation 4, the E2 node (i.e., the O-CU, O-DU, etc.) sends the measurement data, such as, for example, configuration data, configured measurement data, etc. as set forth above to the SMO framework via the O1 interface.

In operation 5, the NRT-RIC retrieves the measurement data for training an AI/ML model in the NRT-RIC.

Referring to FIG. 12A, the SMO initiates a measurement data collection request towards an E2 Node and O-RU for AI/ML model training for Energy Saving optimization. This has the advantage that specific measurement data can be extracted from the O-RU, for example, upon initialization and reconfiguration of the O-RU (e.g., after an update, maintenance, etc.).

Figure 12B:
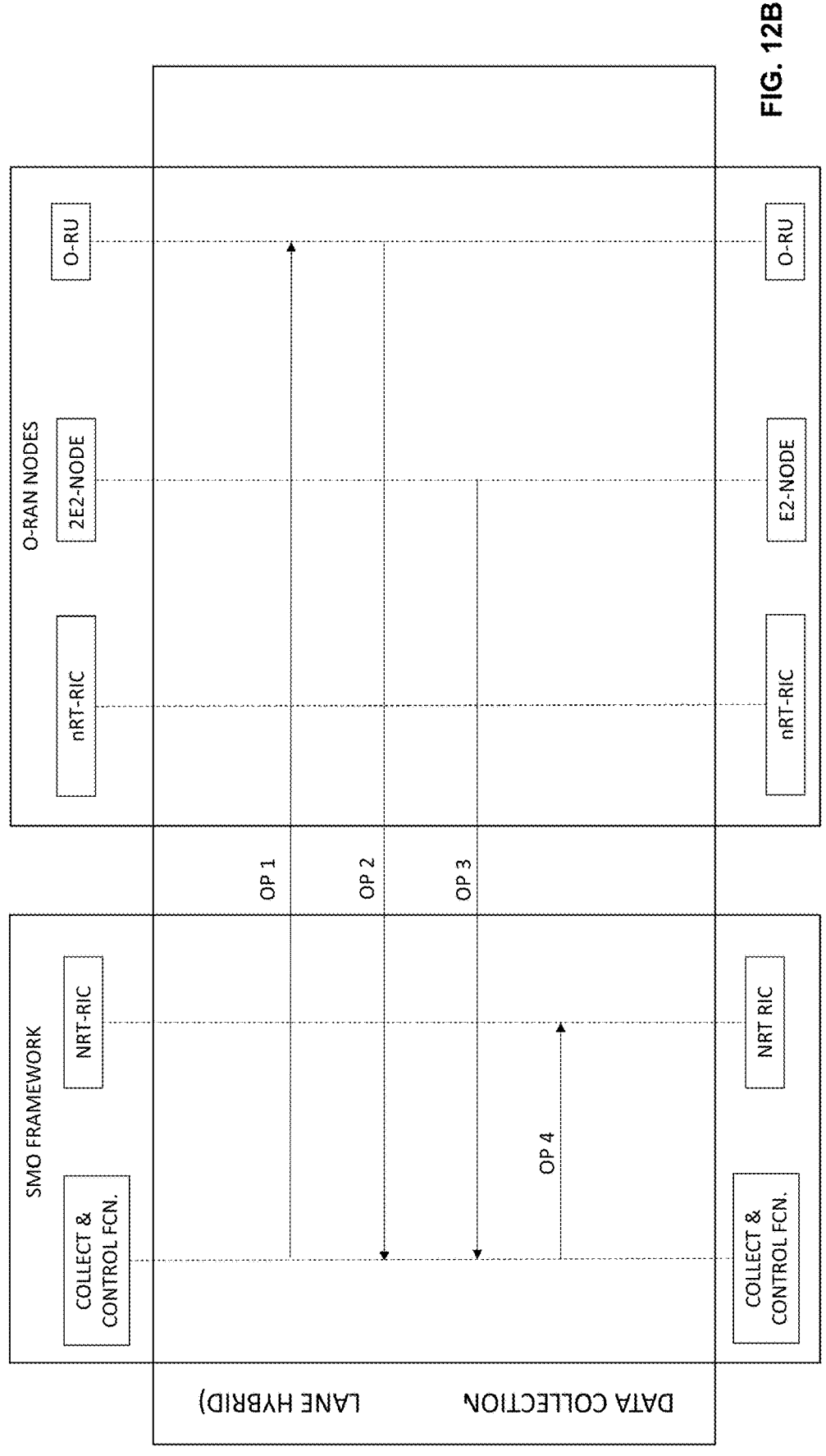
FIG. 12B illustrates a method for collecting data via an O1 interface in hybrid O-RAN architecture according to an embodiment.

FIG. 12B illustrates a method for data collection according to another embodiment. Referring to FIG. 12B, operations 1 to 3 illustrate an alternative data collection of the method for implementing ASM in a hybrid O-RAN architecture. In operation 1, the SMO requests to collect measurement data for AI/ML model training directly to the O-RU via the open FH M-Plane.

In operation 2, upon receiving the data collection request from SMO framework the O-RU sends the measurement data to the SMO framework via the open FH M-Plane. In an embodiment, the optimization data may comprise status and/or capability data of the O-DU and/or O-RU for formulating a performance target comprising ASM functionality. For example, the SMO framework may receive the measurement data periodically or event-based from the O-RU.

In operation 3, the NRT-RIC retrieves the measurement data for training the A/ML model in the NRT-RIC.

Referring to FIG. 12, according to an example embodiment, the E2 Node (i.e., O-DU) and the O-RU send configured measurement data to SMO periodically or event-based for NRT-RIC processing. The periodical communication of configured measurement data based on NRT-RIC processing has the advantage that the NRT-RIC may periodically adjust performance targets (e.g., an A1 policy) or train an AI/ML model in the NRT-RIC based on said measurement data.

Figure 13:
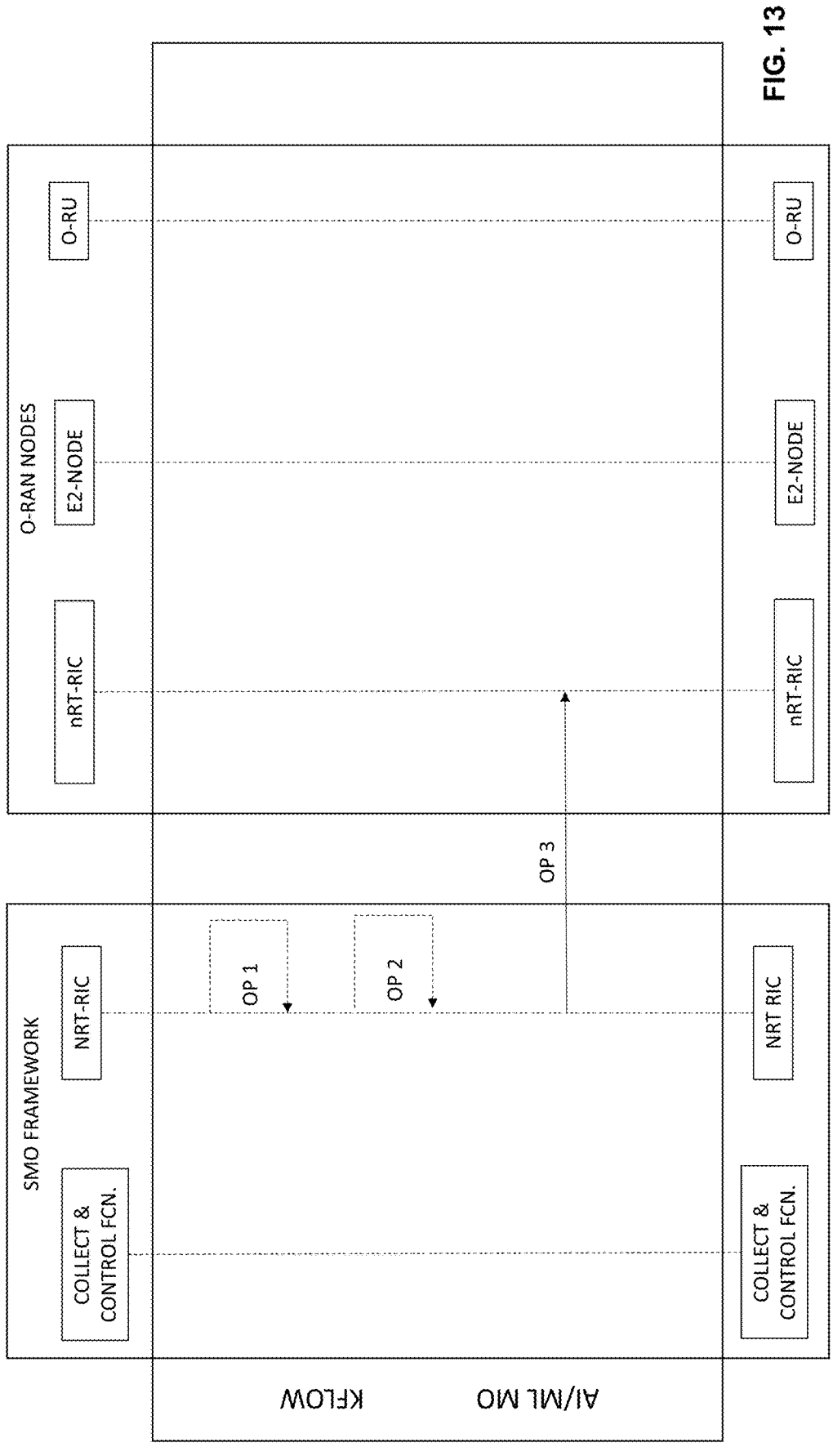
FIG. 13 illustrates a method for training an AI/ML model and deploying the AI/ML model in the nRT-RIC according to an embodiment.

FIG. 13 illustrates an AI/ML model training flow at the NRT-RIC according to an embodiment. Referring to FIG. 13, in operation 1, the NRT-RIC trains an AI/ML model.

In operation 2, the NRT-RIC deploys the trained AI/Mb model to the nRT-RIC and the SMO framework activates the AI/Mb model in the nRT-RIC via the O1 and A1 interfaces.

In operation 3, the NRT-RIC constantly monitors the performance of the trained AI/ML model (i.e., the NRT-RIC analyses the performance of the retrained AI/ML models). For example, the NRT-RIC constantly monitors performance and energy consumption, such as cell load and traffic-related information, EE/EC measurement reports, geolocation information, etc., of the E2 Node and the O-RU for AI/Mb model inference.

Figure 14:
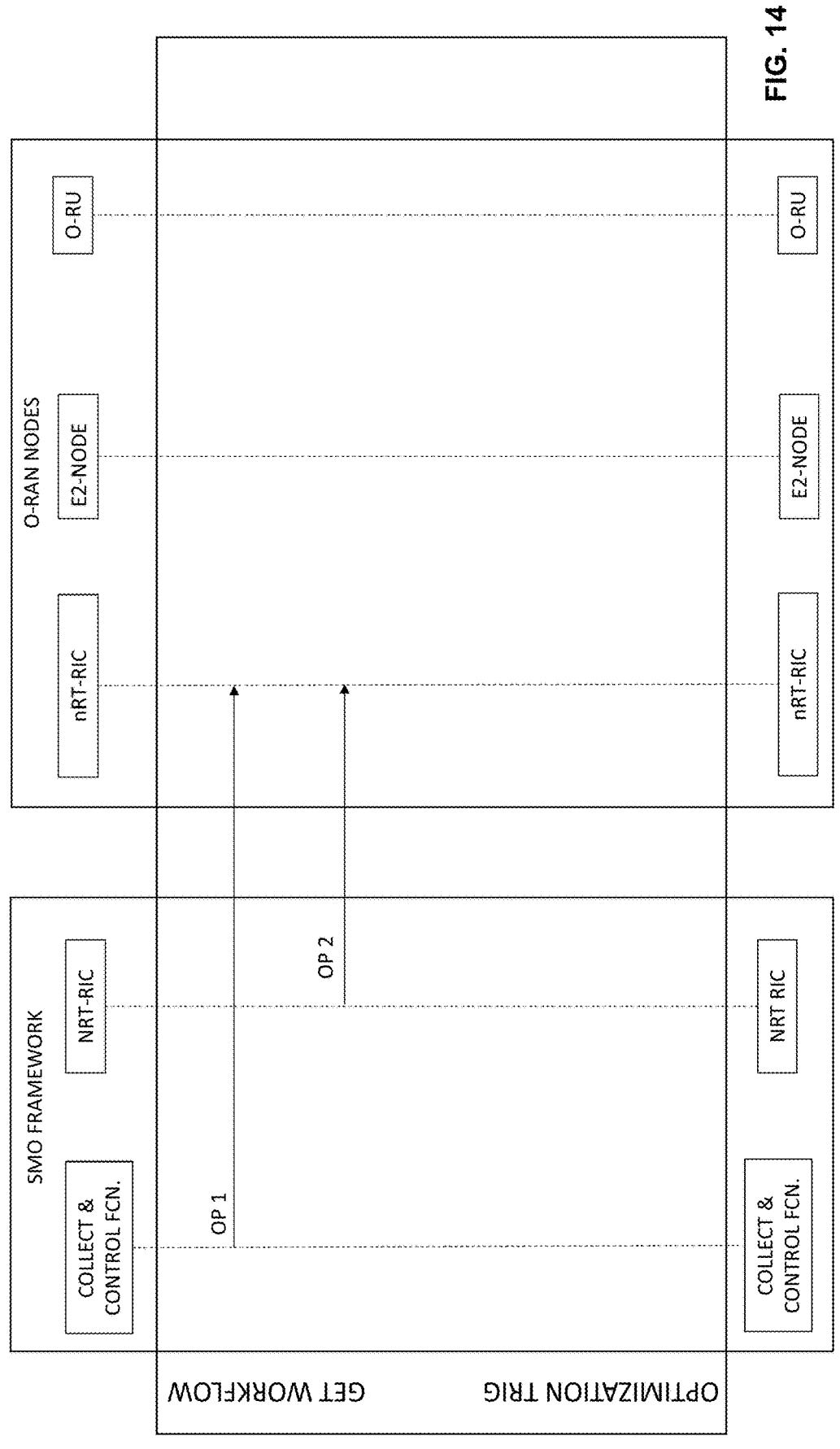
FIG. 14 illustrates a method for activating, by the SMO framework, at least one advanced sleep mode (ASM) in the nRT-RIC according to an embodiment.

FIG. 14 illustrates a method for activating the ASM according to an embodiment. Referring to FIG. 13, in operation 1, SMO may trigger activation of Advance Sleep Mode in the NRT-RIC via O1 interface as a performance target/objective.

Alternatively, in operation 2, the NRT-RIC may provide policies via A1 interface guiding the nRT-RIC to apply EE/ES functions with advanced sleep modes.

Figure 15:
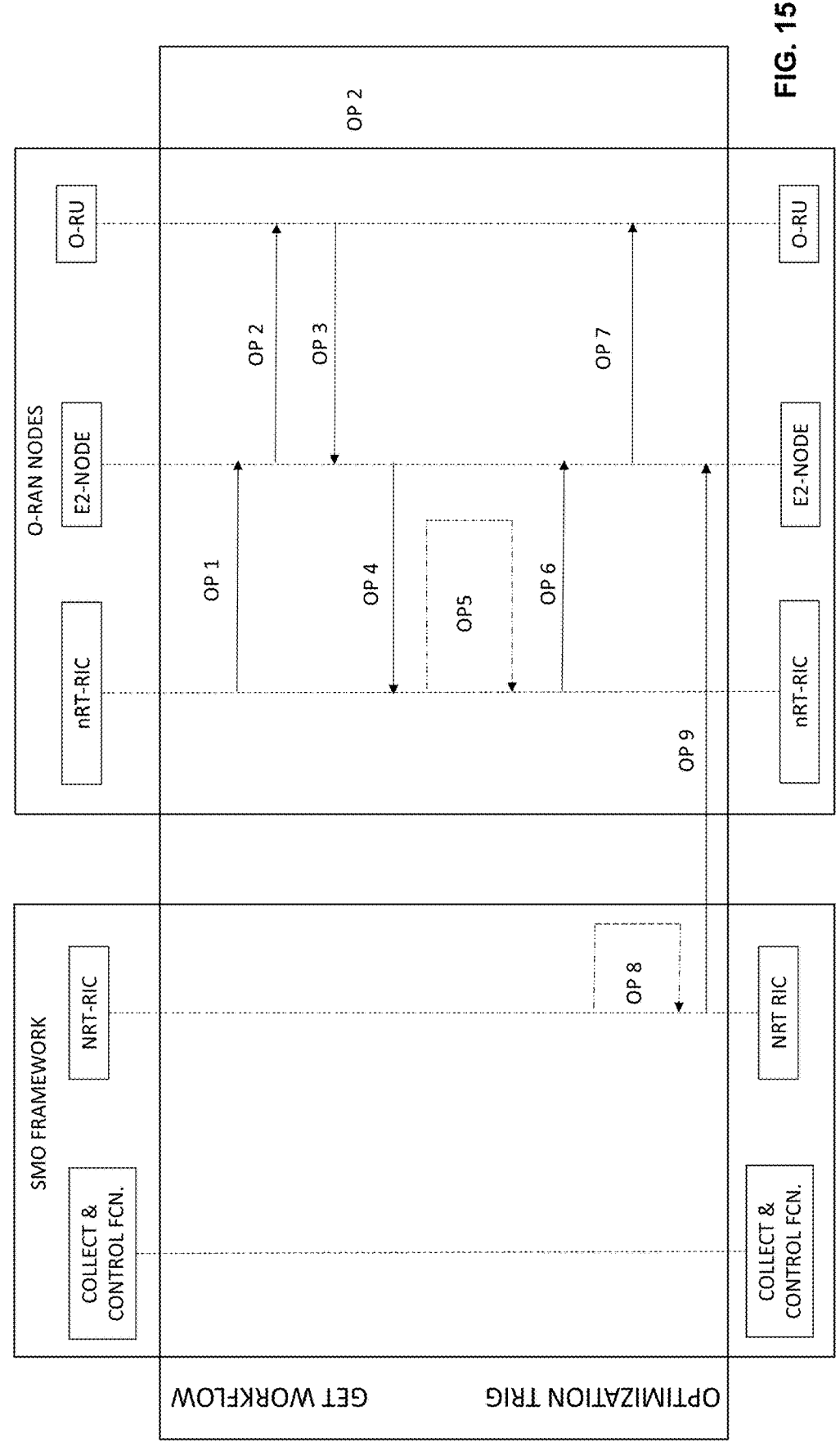
FIG. 15 illustrates the method for collecting the data to temporarily deactivate one or more O-RU components based on the activation of at least one ASM according to an embodiment.

FIG. 15 illustrates a method for activating the ASM according to an embodiment.

Referring to FIG. 15, in operations 1 to 7, once the nRT-RIC received either a performance target via the O1 interface or an A1 policy via the A1 interface, the nRT-RIC based on the AI/ML inference in nRT-RIC that considers optimization policies via the O1 interface (performance triggers) or an A1 policy via the A1 interface. Moreover, based on the evaluation of measurement data and data to temporarily deactivate one or more O-RU components (such as O-DU and/or O-RU capability data) the nRT-RIC may request the E2 Node to prepare and execute the AMS (i.e., generates E2 control commands and/or E2 policy commands).

For example, in operation 1, based on the policy guidance from the NRT-RIC, the nRT-RIC requests measurement data from the E2-node over the E2 interface.

In operation 2, the E2 node requests the O-RU to provide measurement data (e.g., including data to temporarily deactivate one or more O-RU components).

In operation 3, O-RU sends the measurement data (e.g., including the data to temporarily deactivate one or more O-RU components) to the E2-node. The E2-node sends the measurement data (e.g., including the data to temporarily deactivate one or more O-RU components and capability data of the O-RU and/or the O-DU) to the nNRT-RIC.

In operation 5, the nRT-RIC, based on the AI/ML inference in nRT-RIC (that considers optimization policies), evaluates collected data from the E2 node in operation 4 (i.e., by analyzing traffic and implementing techniques such as traffic shaping for data convergence in symbols or slots, adjusting RMSI broadcast intervals and common channels, aligning DRX cycle of UEs in the cell).

In operation 6, the nRT-RIC requests the E2-node to initiate Advance Sleep Mode (ASM). To this end, the nRT-RIC may also send control actions and/or policies (E2 control command and/or E2 policy command) to steer user traffics to different carriers in order to further extend the depth and frequency of the ASMs.

In operation 7, based on the ASM initiation request, the E2 node (i.e., E2-node) sends an O-RU implementation command to the O-RU. Upon receipt of the O-RU implementation command, the O-RU implements the at least one ASM (i.e., ASM type).

In operation 8, as set forth in operation 2 of FIG. 13, the NRT-RIC monitors and analyses the performance of AL/ML model (e.g., the NRT-RIC may constantly monitors and analyses the performance of A/ML model). For example, the NRT-RIC monitors the performance and energy consumption of the E2 Node(s), the energy consumption of O-RU(s), etc.

In an example embodiment, the input data used in the AI/ML model training may include the following measurement data to monitor energy consumption and energy efficiency EC/EE of one or more E-Nodes and one or more O-RUs: Down Link Packet Data Convergence Protocol Service Data Unit DL PDCP SDU Data Volume per interface (Data Volume in DL delivered from O-CU-UP to O-DU, per public land mobile network PLMN, per quality of service QoS level, per slice, per F1-U interface, Xn-U interface, X2-U interface, Up Link Packet Data Convergence Protocol Service Data Unit UP PDCP SDU Data Volume per interface (Data Volume in UP delivered from O-CU-UP to O-DU, per public land mobile network PLMN, per quality of service QoS level, per slice, per F1-U interface, Xn-U interface, X2-U interface, Reference Signal Received Quality RSRQ measurement per Synchronization Signal Block SSB per cell, Reference Signals Received Power RSRP measurement per SSB per cell, Signal to Interference plus Noise Ratio SINR measurement per SSB per cell, Energy consumption, Power consumed by hardware component, Transmit power, etc.

In operation 9, based on the monitoring, the NRT-RIC may determine that a predetermined performance objective is not achieved. In this case, the rApp initiates at least one fallback mechanism to pertain to the predetermined performance objective.

For example, in case the performance of the A/ML model underperforms (does not achieve the predetermined performance objective) the NRT-RIC modifies the A1 policy. To this end, the NRT-RIC may send the modified A1 policy to the nRT-RIC. For example, the NRT-RIC may update or delete an A1 policy for ASMs energy functions and send the modified A1 policy to the NRT-RIC.

Alternatively, the NRT-RIC may initiate an AI/ML model update and/or an AI/ML model retraining based on the predetermined performance objective as received by the SMO framework.

The method for implementing advanced sleep modes may end when the E2 node(s) become(s) non-operational or when the operator disables the SMO framework. However, as long as the SMO framework is enabled, the NRT-RIC continues monitoring the ES functions at the E2 node and O-RU, wherein the E2 node and O-RU operate using the updated parameters/models (i.e., implement the latest commands from the nRT-RIC that include up to date E2 control command(s) and/or up-to-date E2 policy command(s) to prepare and execute the ASMs).

As a result, by the implementation of the latest commands from the nRT-RIC that include up-to-date E2 control command(s) and/or up-to-date E2 policy command(s) to prepare and execute the ASMs while taking into account the capability data of the O-RU and/or the O-DU, the applied ASM types/levels allow for optimal energy efficiency of the operation of the O-RU(s), while maintaining a high level of network performance with the entire O-RAN.

A use case according to one or more example embodiments will now be described below.

Advanced Sleep Modes (ASMs) allow the BS to enter a low power state when not in use, directly saving energy through the intelligent deactivation of O-RU subcomponents. The decision to implement ASMs is a complex task that balances system performance and energy savings. The Near-RT RIC is responsible for configuring cell parameters, such as SSB periodicity, and must consider multiple factors, such as traffic load, user service type, and energy efficiency measurements, to make an informed decision on whether to implement ASMs. The impact of ASMs on O-DU and O-CU energy consumption is flexible and dependent on specific scenarios and network deployments. The goal is to achieve energy savings while maintaining a high level of network performance.

7.1.1 Background

This solution involves the implementation of short and long DRX (Discontinuous Reception) sleep cycles and state transitions in the gNB (gNodeB), like the way it is currently implemented in UEs (User Equipment). The sleep state transitions are of the O-RU initiated by O-DU based on the policy or control provided by Non-RT or Near-RT RIC.

Deeper sleep modes can offer higher energy savings because more equipment can be turned off during longer transition times. However, it's important to understand that deeper sleep modes also have higher transition time moving from active to sleep and vice versa, so a balance needs to be struck between energy savings and network user performance.

Change Request
Document O-RAN.WG1.NES- ver 00.02 CR 0008 rev 1
USE-CASES-TR

| | | | |
|---|---|---|---|
| Title: | Use Case 3: Advance Sleep Modes | | |
| Source to WG: | Rakuten Mobile, Rakuten Symphony | | |
| Target WG : | WG1 UCTG | | |
| Category: | B | CR Creation Date 27 Jan. 2023 | |
| | Use one of the following categories: | | |
| | A (mirror corresponding to a change in an earlier release) | | |
| | B (addition of feature), | | |
| | C (functional modification of feature) | | |
| | D (editorial modification) | | |
| | F (correction) | | |
| | Detailed explanations of the above categories can be found in 3GPP TR 21.900. | | |
| Reason for Change: | Addition of Use Case 3 - Advance Sleep modes | | |
| Summary of change: | Problem statement, solution, deployment options | | |
| Consequences if not aproved: | Missing feature compared to feature plan | | |
| Clauses affected: | 7 | | |
| | Y N | | |
| Other specs affected: (show related CRs) | X | Other core specifications: | <fill in related CRs if "Y"> |
| | X | Test specifications: | <fill in related CRs if "Y"> |
| | X | O&M Specifications: | <fill in related CRs if "Y"> |
| Supporting material: | <provide file name or URL of any material supporting this CR> | | |
| Other comments: | | | |

7 Advanced Sleep Mode

Editor's note: This chapter includes the study of potential impact and enhancements on O-RAN interfaces, counters, and KPIs in case of Advanced Sleep Mode.

7.1 Problem Statement, Solution and Value Proposition

The power consumption of a radio base station (BS) varies with the amount of cell traffic. As traffic increases, the Power Amplifier (PA) becomes the main energy consumer. However, in low traffic scenarios, the main energy consumption is from the processing equipment. Even when no transmission is taking place, some parts of the BS continue to consume energy, presenting an opportunity to reduce unnecessary energy consumption by deactivating unused components.

7.1.2 Type of Advance Sleep Modes

Based on Control methodology and time scale defining 4 sleep modes will be sufficient to cover most of the equipment.

It is worth nothing that O-RAN fronthaul based O-RU do not necessarily need to support all sleep modes but the specifications need to allow for all possible sleep modes.

O-DU can execute sleep modes in O-RU through CUS-Plane indicating the number of Slot's for which O-RU can go into sleep.

| Sleep Depth | Time Duration (Typical) | Control System | Description (Use Case) |
|---|---|---|---|
| Micro Sleep | Symbol to Slot | O-RU Based guidance from Near-RT RIC to DU | The gNB does not need to operate TX/RX within the next few OFDM symbols (TOFDM-Symbol < T ≤ Slot ms). The RF transceivers can be turned off for the prescribed period. The current specifications in O-RAN can effectively handle automatic deactivation when there is no transmission. However, incorporating O-RU's capability to support Micro Sleep would provide additional benefits, as it would allow O-DU to make more informed decisions on traffic shaping to conserve energy. By having the capability to detect and respond to subtle changes in traffic patterns, O-RU can enable O-DU to take more precise energy-saving measures, rather than relying on broad, blanket policies. Sleep duration for Micro Sleep would be based on O-RU Capability to support lowest granuality of sleep. |
| Light Sleep | L Slots (Slot to 10 ms) | O-DU Based on guidance from Near-RT RC. | The gNB does not need to operate TX/RX within the next L Slots (Typically Slot ≤ T ≤ 10 ms). The RF transceivers and additional hardware components can be turned off for the prescribed period. The power consumption is typically lower compared to that of micro sleep mode. This sleep mode can be implemented via transmission blanking when there is no SSB in downlink or PRACH or other uplink signals to be transmitted/received. Sleep duration for Light Sleep would be based on O-RU Capability to support Sleep duration between a slot to 10 ms. |
| Deep Sleep | M Slots (Radio Frame to 100 ms) | O-DU - O-RU Based on Guidance from Near-RT RC | The gNB does not need to operate TX/RX within the next 10 ms ≤ T ≤ 100 ms. Additional hardware components can be turned off for the prescribed period. Note that some hardware components such as timing circuitry must be kept at standby or on, allowing fast transition to Active State. The power consumption in this mode is typically lower compared to that of light sleep mode. This sleep mode requires coordination with other neighbouring cells since user experience would be affected if cell is turned off for such period. Sleep duration for Light Sleep would be based on O-RU Capability to support Sleep duration between a Radio Frame to 100 ms. |
| Hibernate Sleep | N Slots (100 ms to several seconds) | O-DU - O-RU Based on Guidance from Near-RT RC | The gNB does not need to operate TX/RX within the next N Slot (100 ms~Seconds) Most hardware components can be turned off except some hardware components such as timing circuitry which must be kept at standby or on, allowing fast transition to Active State. The power consumption in this mode is typically much lower compared to that of deep sleep mode. Sleep durations greater than 1000 ms are not precluded. Sleep duration for Light Sleep would be based on O-RU Capability to support Sleep duration between a 100 ms to several seconds. This sleep mode will address the capability of O-RU to enable long sleep through CUS-Plane instead of M-Plane in case of Carrier/Cell Switch On/Off. |

7.1.3 Intelligent Scheduling Features for Energy Savings Associated with advance sleep Modes.

7.1.3.1 Data Convergence in Symbols

The base station can use a technique known as "frequency domain scheduling" to optimize the transmission of PDSCH data. This technique allows the base station to group the PDSCH data to be transmitted into fewer time-domain resources but spread it out over more frequency-domain resources. This increases the number of symbols with no data transmission, which results in more efficient use of the available resources and higher data rates.

FIG. 7.1.3-1: Data Convergence in Symbols.

This feature will support elongating SM1 (Symbol to Slot).

7.1.3.2 Data Convergence in Slots

By centralizing the scheduling of PDSCH data in the time domain, the base station can increase the number of symbols and with no data transmission, but it also increases the scheduling delay to a certain extent.

One way of doing it to pack data from multiple Users into minimum slots while allowing increase in user data latency to improve energy efficiency.

Sending PDSCH data in specific slots, such as the master information block (MIB), system information block 1 (SIB1), other system information (OSI), or paging can also be one way of conserving the number of Transmission occasions.

FIG. 7.1.3-2: Data Convergence in Slots

This feature will support elongating SM1 (Symbol to Slot).

7.1.3.3 Dynamic Adjustment of SSB Periodicity

Dynamically adjusting periodicity of SSB from 5 ms to 120 ms based on traffic load and Performance KPI's requirements such as Latency and User throughput can enable deeper sleep modes with longer sleep duration thus saving more energy.

It is worth noting that multiple long SS block periodicities, which enable deep modes, may have a negative impact on the user experience. Devices performing cell re-selection and handover, might experience delay for RRM measurement, based on the SS block of the NR cell. Moreover, they will detect with a very low probability a cell with SS block periodicity higher than 20 ms since the default periodicity assumed by a device is 20 ms. In an LTE system, this is not an issue as the PSS/SSS are always transmitted periodically every 5 ms.

However, the delay can be avoided thanks to a sparse synchronisation raster that NR supports. As many frequency bands with wide bandwidth can be deployed in NR, the device would need to spend unreasonable time in a cell search process along all possible carrier positions, which is much worse than LTE when there are multiple beams at both the network and UE sides to be acquired and paired. The sparse synchronisation raster specifically defines the locations in the frequency domain on which a device must search for the SS Block. These locations not always coincide with the center frequency, as in LTE. However as soon as the device detects SS Block, it will receive all the system information it needs so as to establish a connection to the cell from PBCH and the SIB1, Including the information about the sub-carrier spacing used for the transmission.

Moreover, a 5G NR SA cell with longer than the 20 ms default SS block periodicity could be discovered for cell re-selection in idle/inactive mode, if the right SMTCs are indicated in the serving cell System Information (SI). Two SMTCs in idle/inactive mode are needed and would coexist in the network in this case: the one for SA cells with SS block periodicity of 20 ms, which can be detected at initial cell search and the other one for sleeper cells with SS block periodicity higher than 20 ms, which can be detected during cell re-selection.

This feature will support elongating deep sleep mode as well as hibernate sleep mode 7.1.3.4 Dynamic Adjustment of RMSI Dynamically adjust periodicity of RMSI and other SI based on traffic load and performance KPI requirements such as latency and user throughput.

This feature will support elongating deep sleep mode as well as hibernate sleep mode 7.1.3.5 Dynamic Adjustment of Pagging Frames The base station adjusts the frequency of sending Paging Frames (PFs) based on network traffic. When traffic is low, the base station sends fewer PF per Paging Cycle (PC) to increase the number of symbols with no data transmission. When traffic returns to normal levels, the base station restores the original frequency of sending PFs.

This feature will support elongating all ASMs.

7.1.3.6 Dynamic Adjustment of Common Channel Periodicity

Dynamically adjust periodicity of PRACH, and other common channel such as PUCCH (CSI and other reporting) based on traffic load, signalling load and performance KPI requirements such as latency, jitter, user throughput, packet error rate and access delay etc.

This feature will support elongating all ASMs.

7.1.3.7 Dynamic Adjustment of Uplink Scheduling Request

Dynamically adjust uplink Scheduling Request (SR) periodicity based on ES policy and user performance requirements.

The purpose is the enable deeper sleep modes by increasing the SR periodicity for the UE.

This feature will support elongating all ASMs.

7.1.3.8 Synchronize DRX Cycles of UE's

Synchronize UEs' DRX periods to minimize network awake time, this can be done through O-DU scheduling mechanisms.

This feature will support elongating all ASMs.

7.1.3.9 Intelligent Scheduling in Multi-Carrier Scenario

Shifting users' traffics to other carriers in multi-carrier scenarios to achieve maximum sleep duration in least number of cells can also result in improving energy efficiency of the network.

This feature will support elongating all ASMs.

7.2 Architecture/Deployment Option 7.1.4 Solution 1: ASM with Near-RT RIC Deployment 7.1.4.1 Description and UML Diagram

| Use Case Stage | Evolution/Specification | <<Uses>> Related use |
| --- | --- | --- |
| Goal | Enable Advance Sleep Modes energy saving functions in the network by means of configuration parameter changes, control actions and policy settings by the Near-RT RIC with AI/ML-based solutions. | |
| Actors and Roles | Near-RT RIC acts as Advance Sleep Modes controller. E2 Node and O-RU act as configuration, control action execution and policy enforcement function. SMO/Non-RT RIC acts as policy maker to trigger and guide ES optimization in the Near-RT RIC. | |
| Assumptions | O1 interface connectivity is established between E2 Nodes and SMO and between Near-RT RIC and SMO E2 interface connectivity is established between E2 Nodes and Near-RT RIC. A1 interface is established between Non-RT RIC and Near-RT RIC. Open FH M-Plane interface is established between O-DU and O-RU or between O-RU and SMO. Network is operational. | |

-continued

| Use Case Stage | Evolution/Specification | <<Uses>> Related use |
|---|---|---|
| Pre-conditions | Operator has set the targets for the Energy Saving function in the Non-RT RIC (rApp). O-DU and O-RU have capabilities for supporting Advance Sleep Mode features. | |
| Begins when | Operator enables the optimization functions for Advance Sleep Modes and E2 Node and O-RU become operational. | |
| Steps 1.1, 1.2, 1.3 (M) | SMO initiates specific measurement data collection request towards E2 Node and O-RU for AI/ML model training for Energy Saving optimization. | |
| Steps 2.1, 2.2, 2.3, 2.4 (M) | E2 Node and O-RU send the configured measurement data to SMO periodically or event-based for Non-RT RIC processing. | |
| Step 3 (M) | Non-RT RIC retrieves the collected measurement data for processing. | |
| Steps 4.1, 4.2, 4.3 (M) | Non-RT RIC trains the AI/ML models with the collected data. Trained AI/ML models are deployed and activated in rApps in the Non-RT RIC and xApps in the Near-RT RIC through SMO over the O1 and A1 Interfaces. Non-RT RIC constantly monitors performance and energy consumption, such as cell load and traffic related information, EE/EC measurement reports, geolocation information etc., of the E2 Node and the O-RU for inference. | |
| Steps 5.1, 5.2 (M) | SMO may trigger activation of Advance Sleep Mode in the Near-RT RIC via O1 interface or optionally Non-RT RIC may provide policies via A1 interface guiding the Near-RT RIC for advance sleep modes EE/ES function. | |
| Steps 6.1, 6.2, 6.3, 6.4, 6.5, 6.6 (M) | Based on the AI/ML inference in Near-RT RIC, considering optimization policies, the Near-RT RIC may request the E2 Node to prepare and execute Advance Sleep Mode. Based on the policy guidance from the Non-RT RIC and measurement over E2 interface, the Near-RT RIC may request the E2 Node to initiate Advance Sleep Mode, by analyzing traffic and implementing techniques such as traffic shaping for data convergence in symbols or slots, adjusting RMSI broadcast intervals and common channels, aligning DRX cycle of UE's in the cell. The Near-RT RIC may also send control actions or policies to steer user traffics to different carriers further extend the depth and frequency of sleep modes. | |
| Steps 7.1, 7.2 (M) | Based on performance analysis of AI/ML model, Non-RT RIC may update AIML model in Near-RT RIC. | |
| Ends when | E2 Node becomes non-operational or when the operator disables the optimization functions for Energy Saving. | |
| Exceptions | None | |
| Post Conditions | Non-RT RIC continues closed loop monitoring of Energy Saving function for E2 Node and O-RU. E2 Node and O-RU operate using the newly deployed parameters/models and state. | |

```
@startuml
skin rose
skinparam defaultFontSize 15
autonumber
Box "Service Management & \n Orchestration Framework" #gold
        Participant "Collection & Control" as smo
        Participant " Non-RT RIC" as NRTRIC
End box
Box "O-RAN Nodes" #lightpink
        Participant "Near-RT RIC" as RTRIC
        Participant "E2-Nodes" as E2NODES
        Participant "O-RUs" as ORUs
End box
autonumber 1.1
group Data Collection
alt via O1
smo -> E2NODES          : <<O1>> Data collection request
                          for Energy Saving
E2NODES -> ORUs         : <<FH>> Data collection request
Else via OFH-MP
smo -> ORUs   :<<OFH-MP>> Data collection request
end
autonumber 2.1
alt Via O1
```

```
ORUs -> E2NODES         : <<FH>> Measurement Data Collection
E2NODES -> smo          : <<O1>> Measurement Collection for
                          Energy Saving
Else via OFH-MP
ORUs -> smo             : <<FH>> Measurement Data Collection
E2NODES -> smo          : <<O1>> Measurement Collection for
                          Energy Saving
End
autonumber 3
smo -> NRTRIC           : <<O1>> Data Retrieval
end
autonumber 4.1
group AI/ML workflow
        NRTRIC -> NRTRIC : AI/ML Model training
        NRTRIC -> NRTRIC : Monitoring & Analysis of Energy
        Efficicincy \n & Consumption
(E2 Nodes & O-RU)(s
        NRTRIC -> RTRIC   : <<O1>> or <<O2>> Deploy AI/ML model
end
autonumber 5.1
group Optimization Trigger and Policy
alt via O1
        smo -> RTRIC            : <<O1>> Optimization Trigger/Target
```

45

-continued

```
else via A1
    NRTRIC --> RTRIC        : <<A1>> Intent based Policy
end
autonumber 6.1
group Actor Data Collection & Decision Making
RTRIC -> E2NODES         : <<E2>> Data collection request for
                           Energy Saving
E2NODES -> ORUs          : <<FH>> Data collection request for
                           Energy Saving
ORUs -> E2NODES          : <<FH>> Measurement Data Collection
                           for Energy Saving
E2NODES -> RTRIC         : <<E2>> Measurement Data Collection
                           for Energy Saving
RTRIC -> RTRIC: AI/ML model inference
RTRIC -> E2NODES: <<E2>> Advance Sleep Modes and related energy
savings methods
\nenforecement for Energy saving
E2NODES -> ORUs: <<FH>> Updated O-RU Configurations
autonumber 6.1
group AI/ML workflow
NRTRIC -> NRTRIC : Performance analysis of AI/ML model \n(with
possible actions, e.g. fallback, re-training)
NRTRIC -> RTRIC   : <<O1>> or <<O2>> Update AI/ML model
end
@enduml
```

FIG. 7.1.1-1: Advance Sleep Modes feature flow 7.1.4.2 O-RAN Entity Roles

1) SMO (Including Non-RT RIC)

Collect necessary cell configurations, performance indicators and measurement reports (e.g., cell load and traffic related information, EE/EC measurement reports and geo-location information etc.) from E2 node and O-RU, for the purpose of training AI/ML models that assist in the EE/ES functions.

Trigger & Performs EE/ES AL/ML Model Training/Retraining.

Analyze the Data Received from E2 Node and O-RU to Trigger Advance Sleep Modes Feature Provide optimization trigger, optimization targets, and A1 policies (e.g., enable traffic shaping to elongate sleep modes on 50% peak power consumptions) to Near-RT RIC via O1 or A1 interface 2) Near-RT RIC Collect necessary cell configurations, performance indicators and measurement reports (e.g., cell load related and traffic information, EE/EC measurement reports) from E2 nodes and O-RU.

Receive EE/ES AI/ML model for deployment via O1.

Receive EE/ES related configuration management via O1 interface and/or policies via A1 interface for consideration during optimization.

Analyze the data received from E2 Node and perform AL/Mb model inference to determine Advance Sleep modes actions for EE/ES (e.g., traffic shaping for data convergence in symbols and/or slots, adjusting broadcast intervals of RMSI and common channels, aligning DRX cycle of UE's in the cell) to be performed considering the optimization targets/policies.

Provide policies and/or required information over E2 interface to trigger actions for EE/ES optimization.

3) E2 Node

Report necessary cell configurations, performance indicators and measurement reports (e.g., cell load related and traffic information, EE/EC measurement reports) and capability of Advance sleep modes to SMO via O1 interface and to Near-RT RIC via E2 or O1 Interface.

Execute Advance Sleep Modes on the O-RU based on policy or recommendation from Near-RT RIC.

Perform actions such as shaping for data convergence in symbols or slots, adjusting RMSI broadcast intervals and common channels, aligning DRX cycle of UE's in the cell, and utilizing multi-carrier based energy saving methods to increase frequency and depth of O-RU Sleep.

4) O-RU

Report Advance Sleep Modes related capability information over M-Plane to O-DU.

Transition from active to desired sleep mode instructed by O-DU via CUS-Plane

Report Power consumption and Sleep state related information to O-DU or SMO via M-Plane.

7.1.4.3 Input/Output Data Requirements 7.1.4.3.1 Summary

Input Data

1) SMO and E2 Node

Load statistics per cell and per carrier, such as number of active users, average number of RRC connections, average number of scheduled active users per TTI, PRB utilization, DL/UL Cell/User throughput, PMI/CSI reports.

Latency statistics per cell (if URLLC slices are involved, latency is used in the EE definition, TS 28.554).

Capability of O-DU related to Advance Sleep Modes.

2) O-RU

Power consumption metrics: Mean total and per carrier power consumption.

Power consumption per sleep mode.

Information of O-RU for supported Advance Sleep Modes along with Transition times from Sleep to Active (site/O-RU input power needed for certain EE KPIs).

Output Data

1) Non-RT RIC to Near RT RIC

O1 Configuration (i.e., ES optimization trigger/target) OR

A1 Policy for Execution of Advance sleep modes based on Operator policy.

2) Near-RT RIC to E2 Node

Policy and Guidance on activation of Traffic Shaping to minimize active Symbols and Slots (TTI)

Policy and guidance on execution of Hibernate sleep (As the expected latency is higher than 10 ms)

Policy and guidance on Configuration of Common channels and RMSI.

3) E2 Node to O-RU a. Appropriate Sleep Mode Execution Command Over CUS-Plan 7.2 Impact Analysis on O-RAN Work Groups 7.3 Relation and Impact on 3GPP Specifications 7.4 Gain Analysis 7.5 Feasibility Analysis 7.5.1 Impact to Continuous Operation During Advance Sleep Modes ASMs that are limited to symbol level are not expected to have a significant impact on user performance. However, longer sleep modes that involve shutting down more components or reducing their activity for longer periods of time can have a greater impact on user performance, as they can cause service degradation such as increased latency or reduced data transfer rates.

7.5.2 Impact to Coverage

If O-RU is executing deep sleep modes by adjusting SSB periodicity over 20 ms for NR, UEs may be unable to connect to gNB due to missing SSB measurements, hence the coverage in the area may be impacted. However, this can be tackled with proper configuration sparse synchronization raster when there are multiple carriers.

7.5.3 Impact and Relation to Vendor Specific Scheduling and Beamforming Algorithms Advance sleep modes might impact the cell and user performance.

It is up to the proprietary scheduler algorithm to handle such events most efficiently. Scheduling (e.g., user selection, resource allocation), adaptive SU-MIMO and MU-MIMO (e.g. MIMO mode, spatial streams and layers), scheduling of common and shared channels will be adjusted by the base station as per policies set by the Near-RT RIC.

7.5.4 Limited O-RU/O-DU Capabilities

The O-RU and O-DU may have limitations in terms of implementing sleep modes capabilities. Even if the O-RU supports the ASM feature, it is unlikely that it will support all ASMs due to the overarching specification framework. This may introduce multiple-vendor interoperability issues.

FIG. 7.1.3.1 Data convergence in Symbols, referenced above, is in accordance with FIG. 10.

FIG. 7.1.3-2: Data convergence in Slots, referenced above, is in accordance with FIG. 11.

FIG. 7.1.1-1: Advance Sleep Modes feature flow, referenced above, is in accordance with FIGS. 12A, 12B and 13 to 15.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other devices to cause a series of operational steps to be performed on the computer, other programmable apparatus or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer read-able media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, dif-ferent blocks, or differently arranged blocks than those depicted in the Figures. In some alternative implementa-tions, the functions noted in the blocks may occur out of the order noted in the Figures. For example, two blocks shown in succession may, in fact, be executed concurrently or substantially concurrently, or the blocks may sometimes be executed in the reverse order, depending upon the function-ality involved. It will also be noted that each block of the block diagrams and/or flowchart illustration, and combina-tions of blocks in the block diagrams and/or flowchart illustration, can be implemented by special purpose hard-ware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limited to the implementations. Thus, the operation and behavior of the systems and/or methods were described herein without reference to specific software code. It is understood that software and hardware may be designed to implement the systems and/or methods based on the description herein.

Various further respective aspects and features of embodi-ments of the present disclosure may be defined by the following items:

Item [1]A system for implementing advanced sleep modes in an open radio access network (O-RAN), the system includes: a near-real-time radio access network (RAN) intelligent controller (nRT-RIC) and a service manage-ment and orchestration (SMO) framework, the SMO framework comprising a non-real-time radio access network (RAN) intelligent controller (NRT-RIC), wherein the system is configured to: collect, by the SMO framework, measurement data for training an artificial intelligence/machine learning (AI/ML) model; based on the collected measurement data, by the NRT-RIC, train an AI/ML model and deploy the AI/ML model in the nRT-RIC; activate, by the SMO frame-work, the trained AI/ML model in the nRT-RIC; moni-tor, by the NRT-RIC, energy optimization data for AI/Mb model inference from an open radio unit (O-RU) via an E2 node; activate, by the SMO frame-work, at least one advanced sleep mode (ASM) in the nRT-RIC; based on the activation of the at least one ASM, by the nRT-RIC, collect data to temporarily deactivate one or more O-RU components from the O-RU via the E2 node; based on the activated AI/Mb model and the at least one ASM, evaluate, by nRT-RIC, the collected data to temporarily deactivate one or more O-RU components; based on the evaluating, request, by the nRT-RIC, to initiate the at least one ASM to the O-RU via the E2 node; and based on the ASM initiation request, by the O-RU, implement the at least one ASM.

Item [2] The system as claimed in Item [1], wherein the system is configured to collect the data to temporarily deactivate the one or more O-RU components based on the activation of the at least one ASM, by: sending, by the nRT-RIC, a data collection request for energy saving via an E2 interface to the E2 node; receiving, by the E2 node, the data collection request for energy saving from the nRT-RIC; collecting, by the E2 node, the data to temporarily deactivate the one or more O-RU components from the O-RU via the open FH M-Plane interface; and sending, by the E2 node, the collected data to temporarily deactivate the one or more O-RU components via the E2 interface to the nRT-RIC.

Item [3] The system as claimed in Item [1 or 2], wherein the system is configured to evaluate the collected data to temporarily deactivate the one or more O-RU com-ponents, by: receiving, by the nRT-RIC, the collected data to temporarily deactivate the one or more O-RU components from the E2 node; based on the collected data to temporarily deactivate the one or more O-RU components, applying, by the nRT-RIC, AI/ML model inference; based on the AI/ML model inference, gen-erating, by the nRT-RIC, at least one of an E2 control command to request to initiate the at least one ASM to the E2 node that complies with the O-RU's capabilities; and sending, by the nRT-RIC, the at least one of the E2 control command to the E2 node.

Item [4] The system as claimed in Item [1 or 2], wherein the system is configured to evaluate the collected data to temporarily deactivate the one or more O-RU com-ponents, by: receiving, by the nRT-RIC, the collected data to temporarily deactivate the one or more O-RU components from the E2 node; based on the collected data to temporarily deactivate the one or more O-RU components, applying, by the nRT-RIC, AI/ML model inference; based on the AI/Mb model inference, gen-erating, by the nRT-RIC, at least one of an E2 policy command for an energy savings (ES) that guides the E2 node that complies with the O-RU's capabilities to initiate the at least one ASM; and sending, by the nRT-RIC, the at least one E2 policy command to the E2 node.

Item [5] The system as claimed in any one of Items [1 to 4], wherein the system may be further configured to: based on the implementing, receive, by the NRT-RIC via the SMO framework, feedback comprising a per-formance analysis of the AI/Mb model; analyze, by the NRT-RIC, the performance of the AI/ML model in the nRT-NIC; determine, by the NRT-RIC, that at least one predetermined performance objective is not achieved based on the performance of the AI/ML model; and initiate, by the NRT-RIC, a fallback mechanism to pertain to the at least one predetermined performance objective.

Item [6] The system as claimed in any one of Items [1 to 5], wherein the system is configured to implement the at least one ASM by: based on the capabilities of the O-RU, scheduling, by the E2 node or the O-RU, at least one symbol to minimize a number of symbols in time domain, wherein the E2 node or the O-RU is configured to perform the scheduling by: converging the at least one symbol from time domain into frequency domain to elongate a deactivation time period of the one or more O-RU components, wherein the converged at least one symbol is at least one of a Physical Downlink Channel PDSCH symbol and a Physical Downlink Control Channel PDCCH symbol.

Item [7] The system as claimed in any one of Items [1 to 5], wherein the system is configured to implement the at least one ASM by: based on the capabilities of the O-RU, scheduling, by the E2 node or the O-RU, at least one slot to minimize a number of slots in time domain, wherein the E2 node or the O-RU is configured to perform the scheduling by: converging the at least one slot from time domain into frequency domain to elongate a deactivation time period of the one or more O-RU components, wherein the converged at least one slot is at least one of a Synchronization Signal Block-Master Information Block SSB-MIB slot, System Information Block Type 1 SIB1 slot, SI slot, Paging Frame slot and a Physical Downlink Channel PDSCH slot.

Item [8]A method for implementing advanced sleep modes in an open radio access network (O-RAN), the method includes: collecting, by an service management and orchestration (SMO) framework, measurement data for training an artificial intelligence/machine learning (A/ML) model; based on the collected measurement data, by a non-real-time radio access network (RAN) intelligent controller (NRT-RIC), training an AI/ML model and deploying the AI/ML model in an a near-real-time radio access network (RAN) intelligent controller (nRT-RIC); activating, by the SMO framework, the trained AI/ML model in the nRT-RIC; monitoring, by the NRT-RIC, energy optimization data for AI/ML model inference from an open radio unit (O-RU) via an E2 node; activating, by the SMO framework, at least one advanced sleep mode (ASM) in the nRT-RIC; based on the activation of the at least one ASM, by the nRT-RIC, collecting data to temporarily deactivate one or more O-RU components from the O-RU via the E2 node; based on the activated AI/ML model and the at least one ASM, evaluating, by nRT-RIC, the collected data to temporarily deactivate one or more O-RU components; based on the evaluating, requesting, by the nRT-RIC, to initiate the at least one ASM to the O-RU via the E2 node; and based on the ASM initiation request, by the O-RU, implementing the at least one ASM.

Item [9] The method as claimed in Item [8], wherein collecting the data to temporarily deactivate the one or more O-RU components based on the activation of the at least one ASM may include: sending, by the nRT-RIC, a data collection request for energy saving via an E2 interface to the E2 node; receiving, by the E2 node, the data collection request for energy saving from the nRT-RIC; collecting, by the E2 node, the data to temporarily deactivate the one or more O-RU components from the O-RU via the open FH M-Plane interface; and sending, by the E2 node, the collected data to temporarily deactivate the one or more O-RU components via the E2 interface to the nRT-RIC.

Item [10] The method claimed in Item [8 or 9], wherein evaluating the collected data to temporarily deactivate the one or more O-RU components may include: receiving, by the nRT-RIC, the collected data to temporarily deactivate the one or more O-RU components from the E2 node; based on the collected data to temporarily deactivate the one or more O-RU components, applying, by the nRT-RIC, AI/ML model inference; based on the AI/ML model inference, generating, by the nRT-RIC, at least one of an E2 control command to request to initiate the at least one ASM to the E2 node that complies with the O-RU's capabilities; and sending, by the nRT-RIC, the at least one of the E2 control command to the E2 node.

Item [11] The method as claimed in Item [8 or 9], wherein evaluating the collected data to temporarily deactivate the one or more O-RU components may include: receiving, by the nRT-RIC, the collected data to temporarily deactivate the one or more O-RU components from the E2 node; based on the collected data to temporarily deactivate the one or more O-RU components, applying, by the nRT-RIC, AI/ML model inference; based on the AI/ML model inference, generating, by the nRT-RIC, at least one of an E2 policy command for energy savings (ES) that guides the E2 node that complies with the O-RU's capabilities to initiate the at least one ASM; and sending, by the nRT-RIC, the at least one E2 policy command to the E2 node.

Item [12] The method as claimed in any one of Items [8 to 11], the method may include: based on the implementing, receiving, by the NRT-RIC via the SMO framework, feedback comprising a performance analysis of the AI/ML model; analyzing, by the NRT-RIC, the performance of the AI/Mb model in the nRT-NIC; determining, by the NRT-RIC, that at least one predetermined performance objective is not achieved based on the performance of the AI/ML model; and initiating, by the NRT-RIC, a fallback mechanism to pertain to the at least one predetermined performance objective.

Item [13] The method as claimed in any one of Items [8 to 12], wherein implementing the at least one ASM may include: based on the capabilities of the O-RU, scheduling, by the E2 node or the O-RU, at least one symbol to minimize a number of symbols in time domain, wherein the scheduling may include: converging the at least one symbol from time domain into frequency domain to elongate a deactivation time period of the one or more O-RU components, wherein the converged at least one symbol is at least one of a Physical Downlink Channel PDSCH symbol and a Physical Downlink Control Channel PDCCH symbol.

Item [14] The method as claimed in any one of Items [8 to 12], wherein implementing the at least one ASM, by the E2 node and the O-RU may include: based on the capabilities of the O-RU, scheduling, by the E2 node or the O-RU, at least one slot to minimize a number of slots in time domain, wherein the scheduling may include: converging the at least one slot from time domain into frequency domain to elongate a deactivation time period of the one or more O-RU components, wherein the converged at least one slot is at least one of a Synchronization Signal Block-Master Information Block SSB-MIB slot, a System Information Block Type 1 SIB1 slot, a SI slot, a Paging Frame slot and a Physical Downlink Channel PDSCH slot.

Item [15]A non-transitory computer-readable recording medium having recorded thereon instructions executable by at least one processor, at least one processor configured to implement a method for implementing advanced sleep modes in an open radio access network (O-RAN), the method includes: collecting, by an service management and orchestration (SMO) framework, measurement data for training an artificial intelligence/machine learning (AI/ML) model; based on the collected measurement data, by a non-real-time radio access network (RAN) intelligent controller (NRT-RIC), training an AI/ML model and deploying the AI/ML model in a near-real-time radio access network (RAN) intelligent controller (nRT-RIC); activating, by the SMO framework, the trained AI/ML model in the nRT-RIC; monitoring, by the NRT-RIC, energy optimization data for AI/ML model inference from an open radio unit (O-RU) via an E2 node; activating, by the SMO framework, at least one advanced sleep mode (ASM) in the nRT-RIC; based on the activation of the at least one ASM, by the nRT-RIC, collecting data to temporarily deactivate one or more O-RU components from the O-RU via the E2 node; based on the activated AI/ML model and the at least one ASM, evaluating, by nRT-RIC, the collected data to temporarily deactivate one or more O-RU components; based on the evaluating, requesting, by the nRT-RIC, to initiate the at least one ASM to the O-RU via the E2 node; and based on the ASM initiation request, by the O-RU, implementing the at least one ASM.

Item [16] The non-transitory computer-readable recording medium as claimed in Item [15], wherein collecting the data to temporarily deactivate the one or more O-RU components based on the activation of the at least one ASM may include: sending, by the nRT-RIC, a data collection request for energy saving via an E2 interface to the E2 node; receiving, by the E2 node, the data collection request for energy saving from the nRT-RIC; collecting, by the E2 node, the data to temporarily deactivate the one or more O-RU components from the O-RU via the open FH M-Plane interface; and sending, by the E2 node, the collected data to temporarily deactivate the one or more O-RU components via the E2 interface to the nRT-RIC.

Item [17] The non-transitory computer-readable recording medium as claimed in Item [15 or 16], wherein evaluating the collected data to temporarily deactivate the one or more O-RU components may include: receiving, by the nRT-RIC, the collected data to temporarily deactivate the one or more O-RU components from the E2 node; based on the collected data to temporarily deactivate the one or more O-RU components, applying, by the nRT-RIC, AL/M model inference; based on the AI/ML model inference, generating, by the nRT-RIC, at least one of an E2 control command to request to initiate the at least one ASM to the E2 node that complies with the O-RU's capabilities; based on the AI/ML model inference, generating, by the nRT-RIC, at least one of an E2 policy command for energy savings (ES) that guides the E2 node that complies with the O-RU's capabilities to initiate the at least one ASM; and sending, by the nRT-RIC, at least one of the E2 control command and/or the E2 policy command to the E2 node.

Item [18] The non-transitory computer-readable recording medium as claimed in Item [15 or 17], the method may include: based on the implementing, receiving, by the NRT-RIC via the SMO framework, feedback comprising a performance analysis of the AI/ML model; analyzing, by the NRT-RIC, the performance of the AI/ML model in the nRT-NIC; determining, by the NRT-RIC, that at least one predetermined performance objective is not achieved based on the performance of the A/ML model; and initiating, by the NRT-RIC, a fallback mechanism to pertain to the at least one predetermined performance objective.

Item [19] The non-transitory computer-readable recording medium as claimed in any one of Items [15 to 18], wherein implementing the at least one ASM may include: based on the capabilities of the O-RU, scheduling, by the E2 node or the O-RU, at least one symbol to minimize a number of symbols in time domain, wherein the scheduling may include: converging the at least one symbol from time domain into frequency domain to elongate a deactivation time period of the one or more O-RU components, wherein the wherein the converged at least one symbol is at least one of a Physical Downlink Channel PDSCH symbol and a Physical Downlink Control Channel PDCCH symbol.

Item [20] The non-transitory computer-readable recording medium as claimed in any one of Items [15 to 18], wherein implementing the at least one ASM may include: based on the capabilities of the O-RU, scheduling, by the E2 node or the O-RU, at least one slot to minimize a number of slots in time domain, wherein the scheduling may include: converging the at least one slot from time domain into frequency domain to elongate a deactivation time period of the one or more O-RU components, wherein the converged at least one slot is at least one of a Synchronization Signal Block-Master Information Block SSB-MIB slot, a System Information Block Type 1 SIB1 slot, a SI slot, a Paging Frame slot and a Physical Downlink Channel PDSCH slot.

What is claimed is:

1. A system for implementing advanced sleep modes in an open radio access network (O-RAN), the system comprising:

a near-real-time radio access network (RAN) intelligent controller (nRT-RIC) and a service management and orchestration (SMO) framework, the SMO framework comprising a non-real-time radio access network (RAN) intelligent controller (NRT-RIC), wherein the system is configured to:

collect, by the SMO framework, measurement data for training an artificial intelligence/machine learning (AI/ML) model;

based on the collected measurement data, by the NRT-RIC, train an AI/ML model and deploy the AI/ML model in the nRT-RIC;

activate, by the SMO framework, the trained AI/ML model in the nRT-RIC;

monitor, by the NRT-RIC, energy optimization data for A/ML model inference from an open radio unit (O-RU) via an E2 node;

activate, by the SMO framework, at least one advanced sleep mode (ASM) in the nRT-RIC;

based on the activation of the at least one ASM, by the nRT-RIC, collect data to temporarily deactivate one or more O-RU components from the O-RU via the E2 node;

based on the activated AI/Mb model and the at least one ASM, evaluate, by the nRT-RIC, the collected data to temporarily deactivate one or more O-RU components;

based on the evaluating, request, by the nRT-RIC, to initiate the at least one ASM to the O-RU via the E2 node; and based on the ASM initiation request, by the O-RU, implement the at least one ASM.

2. The system as claimed in claim 1, wherein the system is configured to collect the data to temporarily deactivate the one or more O-RU components based on the activation of the at least one ASM, by:

sending, by the nRT-RIC, a data collection request for energy saving via an E2 interface to the E2 node;

receiving, by the E2 node, the data collection request for energy saving from the nRT-RIC;

collecting, by the E2 node, the data to temporarily deactivate the one or more O-RU components from the O-RU via the open FH M-Plane interface; and sending, by the E2 node, the collected data to temporarily deactivate the one or more O-RU components via the E2 interface to the nRT-RIC.

3. The system as claimed in claim 1, wherein the system is configured to evaluate the collected data to temporarily deactivate the one or more O-RU components, by:

receiving, by the nRT-RIC, the collected data to temporarily deactivate the one or more O-RU components from the E2 node;

based on the collected data to temporarily deactivate the one or more O-RU components, applying, by the nRT-RIC, AI/ML model inference;

based on the AI/ML model inference, generating, by the nRT-RIC, at least one of an E2 control command to request to initiate the at least one ASM to the E2 node that complies with the O-RU's capabilities; and sending, by the nRT-RIC, the at least one of the E2 control command to the E2 node.

4. The system as claimed in claim 1, wherein the system is configured to evaluate the collected data to temporarily deactivate the one or more O-RU components, by:

receiving, by the nRT-RIC, the collected data to temporarily deactivate the one or more O-RU components from the E2 node;

based on the collected data to temporarily deactivate the one or more O-RU components, applying, by the nRT-RIC, AI/ML model inference;

based on the AI/ML model inference, generating, by the nRT-RIC, at least one of an E2 policy command for an energy savings (ES) that guides the E2 node that complies with the O-RU's capabilities to initiate the at least one ASM; and sending, by the nRT-RIC, the at least one E2 policy command to the E2 node.

5. The system as claimed in claim 1, wherein the system is further configured to:

based on the implementing, receive, by the NRT-RIC via the SMO framework, feedback comprising a performance analysis of the AI/ML model;

analyze, by the NRT-RIC, the performance of the AI/ML model in the nRT-NIC;

determine, by the NRT-RIC, that at least one predetermined performance objective is not achieved based on the performance of the AI/Mb model; and initiate, by the NRT-RIC, a fallback mechanism to pertain to the at least one predetermined performance objective.

6. The system as claimed in claim 1, wherein the system is configured to implement the at least one ASM by:

based on the capabilities of the O-RU, scheduling, by the E2 node or the O-RU, at least one symbol to minimize a number of symbols in time domain, wherein the E2 node or the O-RU is configured to perform the scheduling by:

converging the at least one symbol from time domain into frequency domain to elongate a deactivation time period of the one or more O-RU components, wherein the converged at least one symbol is at least one of a Physical Downlink Channel PDSCH symbol and a Physical Downlink Control Channel PDCCH symbol.

7. The system as claimed in claim 1, wherein the system is configured to implement the at least one ASM by:

based on the capabilities of the O-RU, scheduling, by the E2 node or the O-RU, at least one slot to minimize a number of slots in time domain, wherein the E2 node or the O-RU is configured to perform the scheduling by:

converging the at least one slot from time domain into frequency domain to elongate a deactivation time period of the one or more O-RU components, wherein the converged at least one slot is at least one of a Synchronization Signal Block-Master Information Block SSB-MIB slot, System Information Block Type 1 SIB1 slot, SI slot, Paging Frame slot and a Physical Downlink Channel PDSCH slot.

8. A method for implementing advanced sleep modes in an open radio access network (O-RAN), the method comprising:

collecting, by a service management and orchestration (SMO) framework, measurement data for training an artificial intelligence/machine learning (AI/ML) model;

based on the collected measurement data, by a non-real-time radio access network (RAN) intelligent controller (NRT-RIC), training an AI/ML model and deploying the AI/ML model in an a near-real-time radio access network (RAN) intelligent controller (nRT-RIC);

activating, by the SMO framework, the trained AI/ML model in the nRT-RIC;

monitoring, by the NRT-RIC, energy optimization data for AI/ML model inference from an open radio unit (O-RU) via an E2 node;

activating, by the SMO framework, at least one advanced sleep mode (ASM) in the nRT-RIC;

based on the activation of the at least one ASM, by the nRT-RIC, collecting data to temporarily deactivate one or more O-RU components from the O-RU via the E2 node;

based on the activated AI/ML model and the at least one ASM, evaluating, by nRT-RIC, the collected data to temporarily deactivate one or more O-RU components;

based on the evaluating, requesting, by the nRT-RIC, to initiate the at least one ASM to the O-RU via the E2 node; and based on the ASM initiation request, by the O-RU, implementing the at least one ASM.

9. The method as claimed in claim 8, wherein collecting the data to temporarily deactivate the one or more O-RU components based on the activation of the at least one ASM comprises:

sending, by the nRT-RIC, a data collection request for energy saving via an E2 interface to the E2 node;

receiving, by the E2 node, the data collection request for energy saving from the nRT-RIC;

collecting, by the E2 node, the data to temporarily deactivate the one or more O-RU components from the O-RU via the open FH M-Plane interface; and sending, by the E2 node, the collected data to temporarily deactivate the one or more 0-RU components via the E2 interface to the nRT-RIC.

10. The method claimed in claim 8, wherein evaluating the collected data to temporarily deactivate the one or more O-RU components comprises:

receiving, by the nRT-RIC, the collected data to temporarily deactivate the one or more O-RU components from the E2 node;

based on the collected data to temporarily deactivate the one or more O-RU components, applying, by the nRT-RIC, AI/ML model inference;

based on the AI/ML model inference, generating, by the nRT-RIC, at least one of an E2 control command to request to initiate the at least one ASM to the E2 node that complies with the O-RU's capabilities; and sending, by the nRT-RIC, the at least one of the E2 control command to the E2 node.

11. The method as claimed in claim 8, wherein evaluating the collected data to temporarily deactivate the one or more O-RU components comprises:

receiving, by the nRT-RIC, the collected data to temporarily deactivate the one or more O-RU components from the E2 node;

based on the collected data to temporarily deactivate the one or more O-RU components, applying, by the nRT-RIC, AI/ML model inference;

based on the AI/ML model inference, generating, by the nRT-RIC, at least one of an E2 policy command for energy savings (ES) that guides the E2 node that complies with the O-RU's capabilities to initiate the at least one ASM; and sending, by the nRT-RIC, the at least one E2 policy command to the E2 node.

12. The method as claimed in claim 8, the method comprises:

based on the implementing, receiving, by the NRT-RIC via the SMO framework, feedback comprising a performance analysis of the AI/ML model;

analyzing, by the NRT-RIC, the performance of the AI/ML model in the nRT-NIC;

determining, by the NRT-RIC, that at least one predetermined performance objective is not achieved based on the performance of the AI/ML model; and initiating, by the NRT-RIC, a fallback mechanism to pertain to the at least one predetermined performance objective.

13. The method as claimed in claim 8, wherein implementing the at least one ASM comprises:

based on the capabilities of the O-RU, scheduling, by the E2 node or the O-RU, at least one symbol to minimize a number of symbols in time domain, wherein the scheduling comprises:

converging the at least one symbol from time domain into frequency domain to elongate a deactivation time period of the one or more O-RU components, wherein the converged at least one symbol is at least one of a Physical Downlink Channel PDSCH symbol and a Physical Downlink Control Channel PDCCH symbol.

14. The method as claimed in claim 8, wherein implementing the at least one ASM, by the E2 node and the O-RU, comprises:

based on the capabilities of the O-RU, scheduling, by the E2 node or the O-RU, at least one slot to minimize a number of slots in time domain, wherein the scheduling comprises:

converging the at least one slot from time domain into frequency domain to elongate a deactivation time period of the one or more O-RU components, wherein the converged at least one slot is at least one of a Synchronization Signal Block-Master Information Block SSB-MIB slot, a System Information Block Type 1 SIB1 slot, a SI slot, a Paging Frame slot and a Physical Downlink Channel PDSCH slot.

15. A non-transitory computer-readable recording medium having recorded thereon instructions executable by at least one processor, at least one processor configured to implement a method for implementing advanced sleep modes in an open radio access network (O-RAN), the method comprising:

collecting, by a service management and orchestration (SMO) framework, measurement data for training an artificial intelligence/machine learning (AI/ML) model;

based on the collected measurement data, by a non-real-time radio access network (RAN) intelligent controller (NRT-RIC), training an AI/ML model and deploying the AI/ML model in a near-real-time radio access network (RAN) intelligent controller (nRT-RIC);

activating, by the SMO framework, the trained AI/ML model in the nRT-RIC;

monitoring, by the NRT-RIC, energy optimization data for AI/ML model inference from an open radio unit (O-RU) via an E2 node;

activating, by the SMO framework, at least one advanced sleep mode (ASM) in the nRT-RIC;

based on the activation of the at least one ASM, by the nRT-RIC, collecting data to temporarily deactivate one or more O-RU components from the O-RU via the E2 node;

based on the activated AI/ML model and the at least one ASM, evaluating, by nRT-RIC, the collected data to temporarily deactivate one or more O-RU components;

based on the evaluating, requesting, by the nRT-RIC, to initiate the at least one ASM to the O-RU via the E2 node; and based on the ASM initiation request, by the O-RU, implementing the at least one ASM.

16. The non-transitory computer-readable recording medium as claimed in claim 15, wherein collecting the data to temporarily deactivate the one or more O-RU components based on the activation of the at least one ASM, comprises:

sending, by the nRT-RIC, a data collection request for energy saving via an E2 interface to the E2 node;

receiving, by the E2 node, the data collection request for energy saving from the nRT-RIC;

collecting, by the E2 node, the data to temporarily deactivate the one or more O-RU components from the O-RU via the open FH M-Plane interface; and sending, by the E2 node, the collected data to temporarily deactivate the one or more 0-RU components via the E2 interface to the nRT-RIC.

17. The non-transitory computer-readable recording medium as claimed in claim 15, wherein evaluating the collected data to temporarily deactivate the one or more O-RU components, comprises:

receiving, by the nRT-RIC, the collected data to temporarily deactivate the one or more O-RU components from the E2 node;

based on the collected data to temporarily deactivate the one or more O-RU components, applying, by the nRT-RIC, AI/ML model inference;

based on the AI/ML model inference, generating, by the nRT-RIC, at least one of an E2 control command to request to initiate the at least one ASM to the E2 node that complies with the O-RU's capabilities;

based on the AI/ML model inference, generating, by the nRT-RIC, at least one of an E2 policy command for energy savings (ES) that guides the E2 node that complies with the O-RU's capabilities to initiate the at least one ASM; and sending, by the nRT-RIC, at least one of the E2 control command and/or the E2 policy command to the E2 node.

18. The non-transitory computer-readable recording medium as claimed in claim 15, the method comprises:

based on the implementing, receiving, by the NRT-RIC via the SMO framework, feedback comprising a performance analysis of the AI/ML model;

analyzing, by the NRT-RIC, the performance of the AI/ML model in the nRT-NIC;

determining, by the NRT-RIC, that at least one predetermined performance objective is not achieved based on the performance of the AI/ML model; and initiating, by the NRT-RIC, a fallback mechanism to pertain to the at least one predetermined performance objective.

19. The non-transitory computer-readable recording medium as claimed in claim 15, wherein implementing the at least one ASM comprises:

based on the capabilities of the O-RU, scheduling, by the E2 node or the O-RU, at least one symbol to minimize a number of symbols in time domain, wherein the scheduling, comprises:

converging the at least one symbol from time domain into frequency domain to elongate a deactivation time period of the one or more O-RU components, wherein the converged at least one symbol is at least one of a Physical Downlink Channel PDSCH symbol and a Physical Downlink Control Channel PDCCH symbol.

20. The non-transitory computer-readable recording medium as claimed in claim 15, wherein implementing the at least one ASM comprises:

based on the capabilities of the O-RU, scheduling, by the E2 node or the O-RU, at least one slot to minimize a number of slots in time domain, wherein the scheduling, comprises:

converging the at least one slot from time domain into frequency domain to elongate a deactivation time period of the one or more O-RU components, wherein the converged at least one slot is at least one of a Synchronization Signal Block-Master Information Block SSB-MIB slot, a System Information Block Type 1 SIB1 slot, a SI slot, a Paging Frame slot and a Physical Downlink Channel PDSCH slot.

* * * * *